(12) United States Patent
Love et al.

(10) Patent No.: US 11,868,256 B2
(45) Date of Patent: Jan. 9, 2024

(54) TECHNIQUES FOR METADATA UPDATING AND RETRIEVAL

(71) Applicant: EMC IP Holding Company LLC, Hopkinton, MA (US)

(72) Inventors: Philip Love, Goleta (CA); Vladimir Shveidel, Pardes-Hana (IL); Bar David, Rishon Lezion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 136 days.

(21) Appl. No.: 17/380,610

(22) Filed: Jul. 20, 2021

(65) Prior Publication Data
US 2023/0026819 A1    Jan. 26, 2023

(51) Int. Cl.
*G06F 12/0804* (2016.01)
*G06F 16/23* (2019.01)

(52) U.S. Cl.
CPC ...... *G06F 12/0804* (2013.01); *G06F 16/2358* (2019.01)

(58) Field of Classification Search
CPC .......................... G06F 12/0804; G06F 16/2358
See application file for complete search history.

(56) References Cited

U.S. PATENT DOCUMENTS

| 10,956,346 | B1* | 3/2021 | Ben-Yehuda | ....... G06F 13/4027 |
| 2014/0258628 | A1* | 9/2014 | Shivashankaraiah | ........................ G06F 12/0871 711/129 |
| 2019/0310796 | A1* | 10/2019 | Perez | .................... G06F 3/0679 |
| 2020/0241793 | A1 | 7/2020 | Shveidel et al. | |

OTHER PUBLICATIONS

Shveidel, et al., et al., "System and Method for Consistent Metadata Access Based on Local Locks Semantics in a Multi-Node Cluster," U.S. Appl. No. 17/243,252, filed Apr. 28, 2021.

* cited by examiner

*Primary Examiner* — Prasith Thammavong
(74) *Attorney, Agent, or Firm* — Muirhead and Saturnelli, LLC

(57) ABSTRACT

Processing a read request to read metadata from an entry of a metadata page may include: determining whether the metadata page is cached; responsive to determining the metadata page is cached, obtaining the first metadata from the cached metadata page; responsive to determining the metadata page is not cached, determining whether the requested metadata is in a metadata log of metadata changes stored in a volatile memory; and responsive to determining the metadata is the metadata log of metadata changes stored in the volatile memory, obtaining the requested metadata from the metadata log. Processing a write request that overwrites an existing value of a metadata page with an updated value may include: recording a metadata change in the metadata log that indicates to update the metadata page with the updated value; and performing additional processing during destaging that uses the existing value prior to overwriting it with the updated value.

17 Claims, 11 Drawing Sheets

TECHNIQUES FOR METADATA UPDATING AND RETRIEVAL

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing metadata requests comprising: receiving a read request to read first metadata from a first entry of a first metadata page; determining whether the first metadata page is included in a cache; responsive to determining the first metadata page is included in the cache, obtaining the first metadata from a cached copy of the first metadata page included in the cache and returning the first metadata. responsive to determining the first metadata page is not included in the cache, determining whether the first metadata is included in a metadata log of metadata changes stored in a volatile memory; and responsive to determining the first metadata is included in the metadata log of metadata changes stored in the volatile memory, obtaining the first metadata from the metadata log and returning the first metadata.

In at least one embodiment, the metadata log of metadata changes may include an active set of buckets of metadata changes, wherein each of the buckets of the active set may be uniquely associated with a different one of a plurality of metadata pages. Determining whether the first metadata is included in a metadata log of metadata changes stored in volatile memory may include: mapping a first index uniquely identifying the first metadata page to a first bucket of the active set; and searching the first bucket for a recorded metadata change including the first metadata. The first entry may be one of a plurality of entries included in the first metadata page.

In at least one embodiment, the metadata change log may record first metadata changes made to a plurality of metadata pages and wherein each of the first metadata changes may be represented as a tuple including a logical index uniquely identifying one of the plurality of metadata pages, an entry index identifying an entry in said one metadata page, a type indicating a type of metadata change or update, and a new metadata value to be stored in the entry identified by the logical index and the entry index of the tuple.

In at least one embodiment, responsive to determining the first metadata is not included in the metadata log of metadata changes stored in the volatile memory, processing may include constructing a latest version of the first metadata page. Constructing the latest version of the first metadata page may include: retrieving a stored version of the first metadata page from non-volatile backend storage; and applying first metadata changes to the stored version of the first metadata page. The first metadata changes may include one or more metadata changes of the metadata log stored in the volatile memory. The first metadata changes may include one or more metadata changes of the metadata log that have been destaged from the metadata log and are stored in the volatile memory to non-volatile storage.

In at least one embodiment, processing may include: receiving a write request to update second metadata from a second entry of a second metadata page; recording a first metadata change in the metadata log of the volatile memory, wherein the first metadata change indicates to update the second entry of the second metadata page with the second metadata as an updated value; and performing first processing to destage the first metadata change from the metadata log of the volatile memory. The first processing to destage the first metadata change from the metadata log may include: determining whether the first metadata change overwrites an existing value of the second entry of the second metadata page where the existing value is needed in performing second processing prior to overwriting the existing value with the second metadata as the updated value; and responsive to determining that the first metadata change overwrites an existing value of the second entry of the second metadata page where the existing value is needed in performing second processing prior to overwriting the existing value with the second metadata as the updated value. The second processing may include: reading from non-volatile storage a stored version of the second metadata page; obtaining, from the stored version of the second metadata page, the existing value of the second entry of the second metadata page; performing third processing using the existing value of the second entry of the second metadata page; and after completing the third processing, applying one or more metadata changes to the second metadata page, wherein the one or more metadata changes include the first metadata change that overwrites the existing value of the second entry of the second metadata page with the second metadata. The first metadata change may overwrite a first pointer or address with a second pointer or address, wherein the first pointer or address may be used to reference a first data block storing first user data, and wherein the second pointer or address may be used to reference a second data block storing second user data. The first pointer or address may be used to indirectly reference a first data block storing first user data, and wherein the second pointer or address may be used to indirectly reference a second data block storing second user data. The first metadata change may be one of a plurality of metadata changes recorded in the metadata log stored in the virtual memory in response to receiving a write I/O operation from a host. The write I/O may write the second user data to a target logical address. The first user data may be stored at a target logical address prior to performing the write I/O, and the write I/O may overwrite the first user data stored at the target logical address with the second user data. The third processing may include using the first pointer or address to access a reference count associated with the first data block and decrementing the reference count associated with the first data block.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
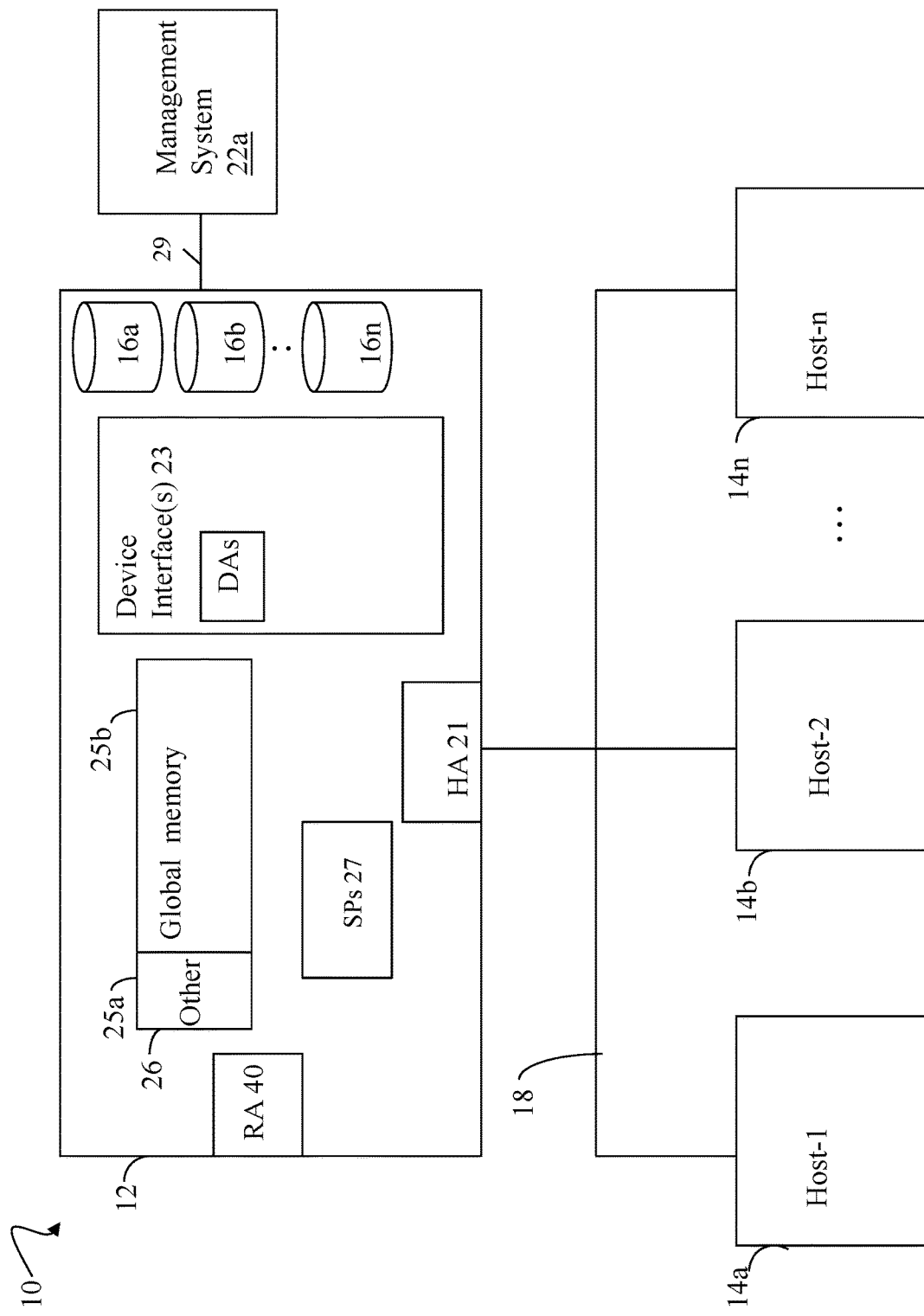
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14*a*-*n*. The data storage array may include one or more RAs that may be used, for example, to facilitate communications between data storage arrays. The data storage array may also include one or more device interfaces 23 for facilitating data transfers to/from the data storage devices 16*a*-16*n*. The data storage device interfaces 23 may include device interface modules, for example, one or more disk adapters (DAs) (e.g., disk controllers) for interfacing with the flash drives or other physical storage devices (e.g., PDS 16*a*-*n*). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25*b* may be used to facilitate data transfers and other communications between the device interfaces, the HAs and/or the RAs in a data storage array. In one embodiment, the device interfaces 23 may perform data operations using a system cache that may be included in the global memory 25*b*, for example, when communicating with other device interfaces and other components of the data storage array. The other portion 25*a* is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14*a*-14*n* provide data and access control information through channels to the storage systems 12, and the storage systems 12 may also provide data to the host systems 14*a*-*n* also through the channels. The host systems 14*a*-*n* do not address the drives or devices 16*a*-16*n* of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22*a* that may be used to manage and monitor the data storage system 12. In one embodiment, the management system 22*a* may be a computer system which includes data storage system management software or application such as may execute in a web browser. A data storage system manager may, for example, view information about a current data storage configuration such as LUNs, storage pools, and the like, on a user interface (UI) in a display device of the management system 22*a*. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a higher end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
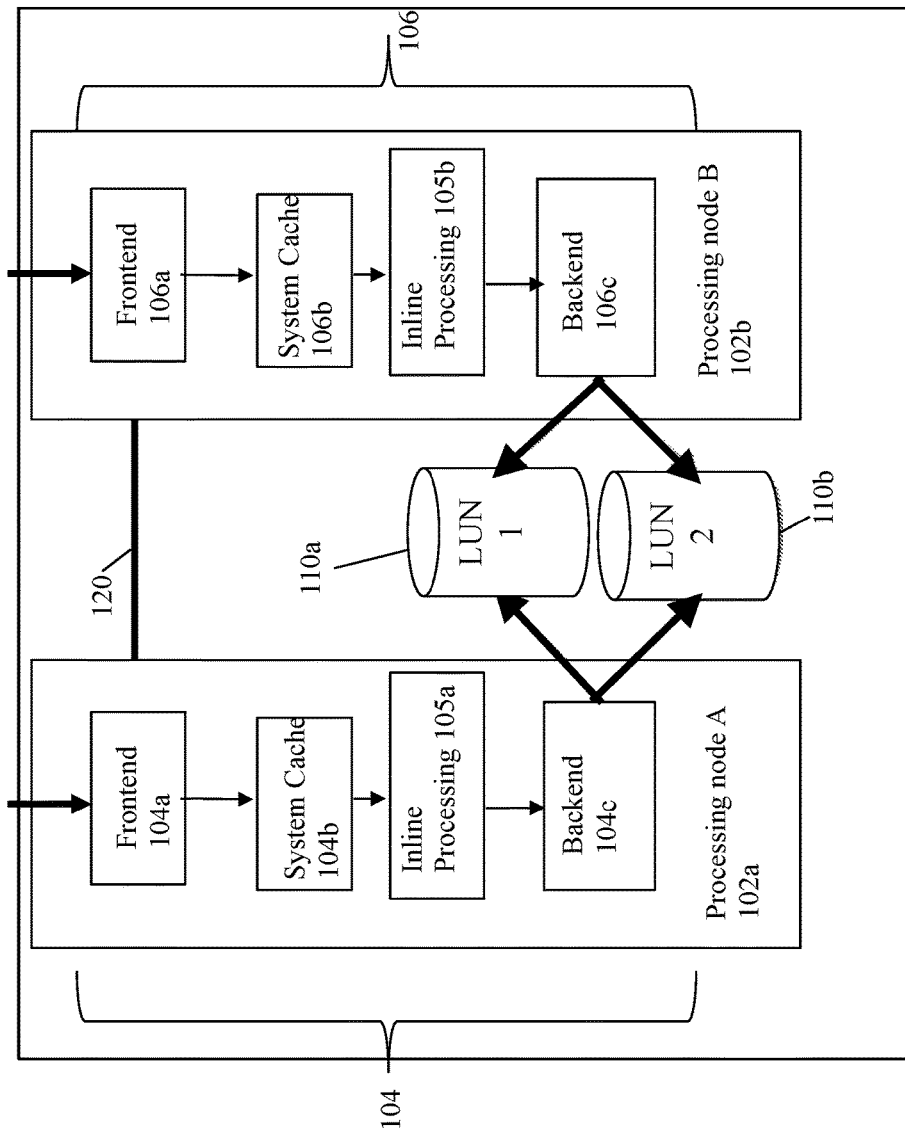
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data deduplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes, or more generally I/Os, directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be generally identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by code executing on the one or more processors of each node. Each node of the pair may include its own resources such as its own local (i.e., used only by the node) resources such as local processor(s), local memory, and the like.

Consistent with other discussion herein, a cache may be used for caching write I/O data and other cached information. The other cached information may include, for example, cached operations or commands such as create snapshot commands. In one system, the cache used for caching logged writes may be implemented using multiple caching devices or PDs, such as non-volatile (NV) SSDs such as NVRAM devices that are external with respect to both of the nodes or storage controllers. The caching devices or PDs used to implement the cache may be configured in a RAID group of any suitable RAID level for data protection. The caching PDs form a shared cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory may also be used for caching information, such as blocks or pages of user data and metadata. For example, such node-local cached pages of user data and metadata may be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes may also each have local volatile memory used as a node local cache for storing data, structures and other information. The local volatile memory local to one of the nodes may be used exclusively by that one node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log file may be used to optimize write operation latency. Generally, a write operation writing data is received by the data storage system from a host or other client. The data storage system then performs processing to persistently record the write operation in the log. Once the write operation is persistently recorded in the log, the data storage system may send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed may now be reclaimed for reuse.

It should be noted that the flushing of the log may be performed in response to an occurrence of any one or more defined conditions. For example, the log may be flushed in response to determining that the amount of reclaimed log space available for use and allocation is less than a specified threshold amount or size.

In at least one embodiment, a metadata (MD) structure of mapping information may be used in accordance with the techniques herein.

The mapping information may be used, for example, to map a logical address, such as a LUN and an LBA or offset, to its corresponding storage location, such as a physical storage location on BE non-volatile PDs of the system. Consistent with discussion elsewhere herein, write requests or operations stored in the log may be flushed to the BE PDs (non-volatile) providing storage locations for the written data. For example, a logged write operation that writes first data to a logical address may be flushed whereby the logged first data is written out to a physical storage location on a BE PD. The mapping information may be used to map the logical address to the physical storage location containing the content or data stored at the logical address. In at least one embodiment, the mapping information may include a MD structure that is hierarchical structure of multiple layers of MD pages or blocks.

Figure 3:
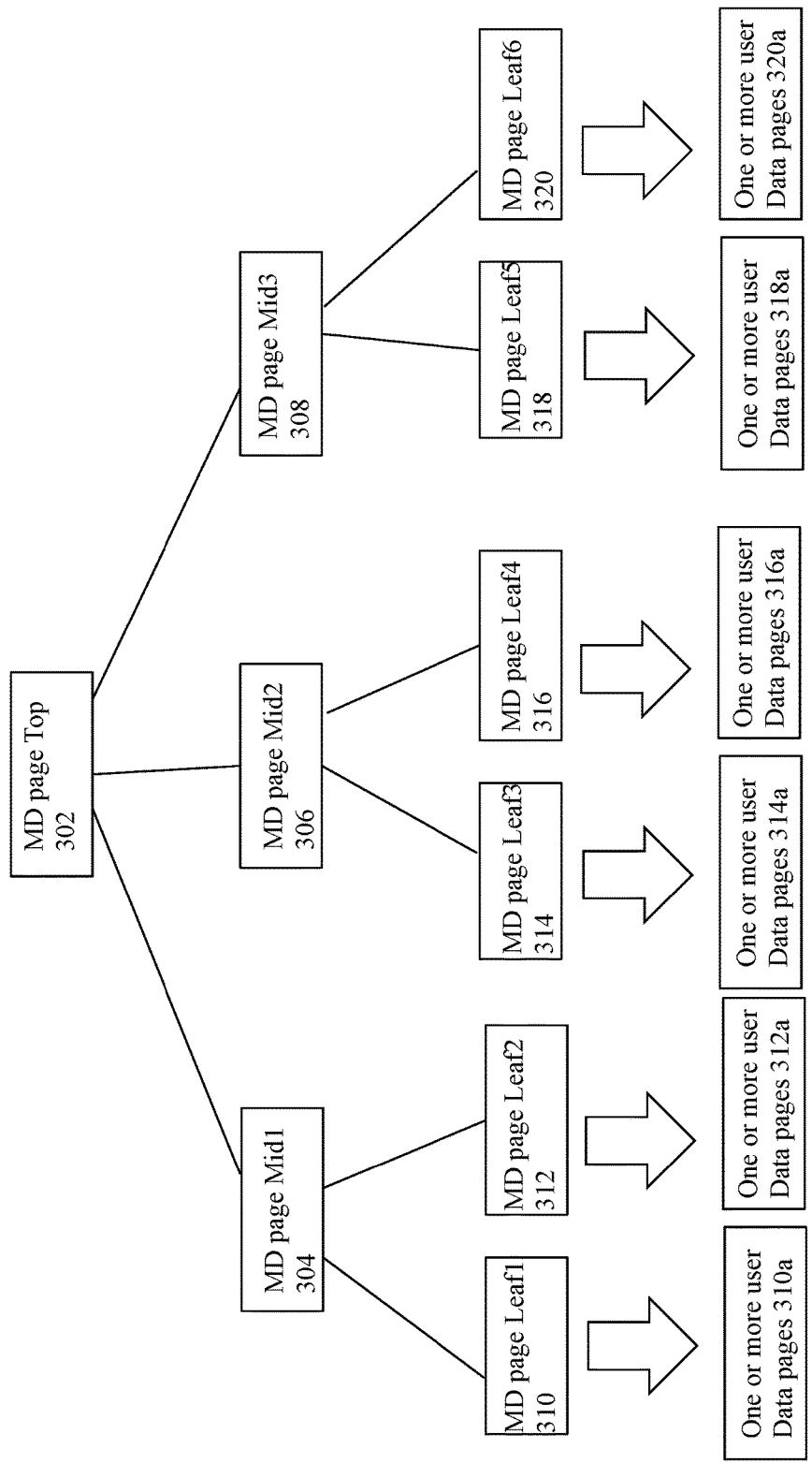
FIGS. 3, 4, 5, 6, 9A and 9B are examples of mapping information in the form of a metadata structure that may be used in connection with mapping logical addresses to physical addresses or storage locations in an embodiment in accordance with the techniques herein.

In at least one embodiment, the mapping structure for a LUN, such as a LUN A, may be in the form of a tree having a plurality of levels of MD pages. More generally, the mapping structure may be in the form of any ordered list or hierarchical structure. In at least one embodiment, the mapping structure for the LUN A may include LUN MD in the form of a tree having 3 levels including a single top or root node (TOP node), a single mid-level (MID node) and a bottom level of leaf nodes (LEAF nodes), where each of the MD page leaf nodes may point to, or reference (directly or indirectly) one or more pages of stored data, such as user data stored on the LUN A. Each node in the tree may correspond to a MD page including MD for the LUN A. More generally, the tree or other hierarchical structure of various MD pages of the mapping structure for the LUN A may include any suitable number of levels, such as more than 3 levels where there are multiple mid-levels. In at least one embodiment the tree of MD pages for the LUN may be a B+ tree, also sometimes referred to as an "N-ary" tree, where "N" indicates that each node in the tree structure may have up to a maximum of N child nodes. For example, in at least one embodiment, the tree of MD pages for the LUN may specify N=512 whereby each node in the tree structure may have up to a maximum of N child nodes. For simplicity of illustration, the tree structure of MD pages, corresponding to the mapping structure in at least one embodiment, is represented in FIG. 3 as including only 3 levels where each node in the tree may have at most 3 child nodes. Generally, the techniques herein may be used with any layered or hierarchical structure of MD pages.

Referring to FIG. 3, shown is an example 300 of a tree of MD pages that may be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which may also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node may include a reference used to access (directly or indirectly) each of its one or more child nodes. For example, the root node MD page top 302 may include addresses or pointers used to access each of its child nodes 304, 306 and 308. The mid-level node MD page mid1 304 may include addresses or pointers used to access each of its child leaf nodes 310, 312. The mid-level node MD page mid 306 may include addresses or pointers used to access each of its child leaf nodes 314, 316. The mid-level node MD page mid 308 may include addresses or pointers used to access each of its child leaf nodes 318, 320.

In at least one embodiment, each of the addresses or pointers included in a MD page that references a location in another MD page or references a location in a UD page may be a physical storage location on the back-end PDs. Thus, the traversal between connected nodes of the structure 300 may correspond to traversing physical address or storage locations included in pages or nodes that are parent nodes.

In connection with accessing a particular UD page in at least one embodiment, all MD pages in a path from the root or top level of the tree to the UD page may be required to be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages may include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 may generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf may hold MD for a specified number of LBAs of a LUN. For example, in one embodiment each MD leaf may hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page may vary with embodiment. For example, in at least one embodiment, consecutive sequential subranges of the LUN's logical address space may be mapped to the MD page leaves. Additionally, when the tree is traversed in a depth first manner, the MD page leaves may correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 may be of a predetermined size and each of the MD pages may hold a known number of entries containing pointer or address values. In such a case and in combination with the correspondence of sequential consecutive LBA ranges of each MD leaf page, an embodiment may perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 may be known to include MD relevant for accessing data on a particular LUN and one or more LBAs of that LUN. For example, consistent with discussion above, element 310a denotes the data blocks for LBAs 0-511 of a LUN. In order to access the data block for an LBA of the LUN in the LBA subrange 0-511, MD pages 302, 304 and 310 may be traversed in sequential order. In particular, the first entry or offset of the MD page top 302 may contain the address of the MD page mid 1 304; the first entry or offset of the MD page mid 1 304 may contain the address of the MD page leaf 1 310; and the first entry or offset of the MD page leaf 1 310 may contain the address of one of the data blocks of 310a.

In a similar manner, a mapping may be made regarding what MD pages of the structure 300 and entries thereof are used in connection with obtaining data blocks containing data for any particular LUN and LBA. In at least one embodiment, the particular MD pages used to access a data block including data for a particular LUN and LBA may be known based on such mappings and correspondence of LBA subranges to particular MD leaf pages.

Figure 4:
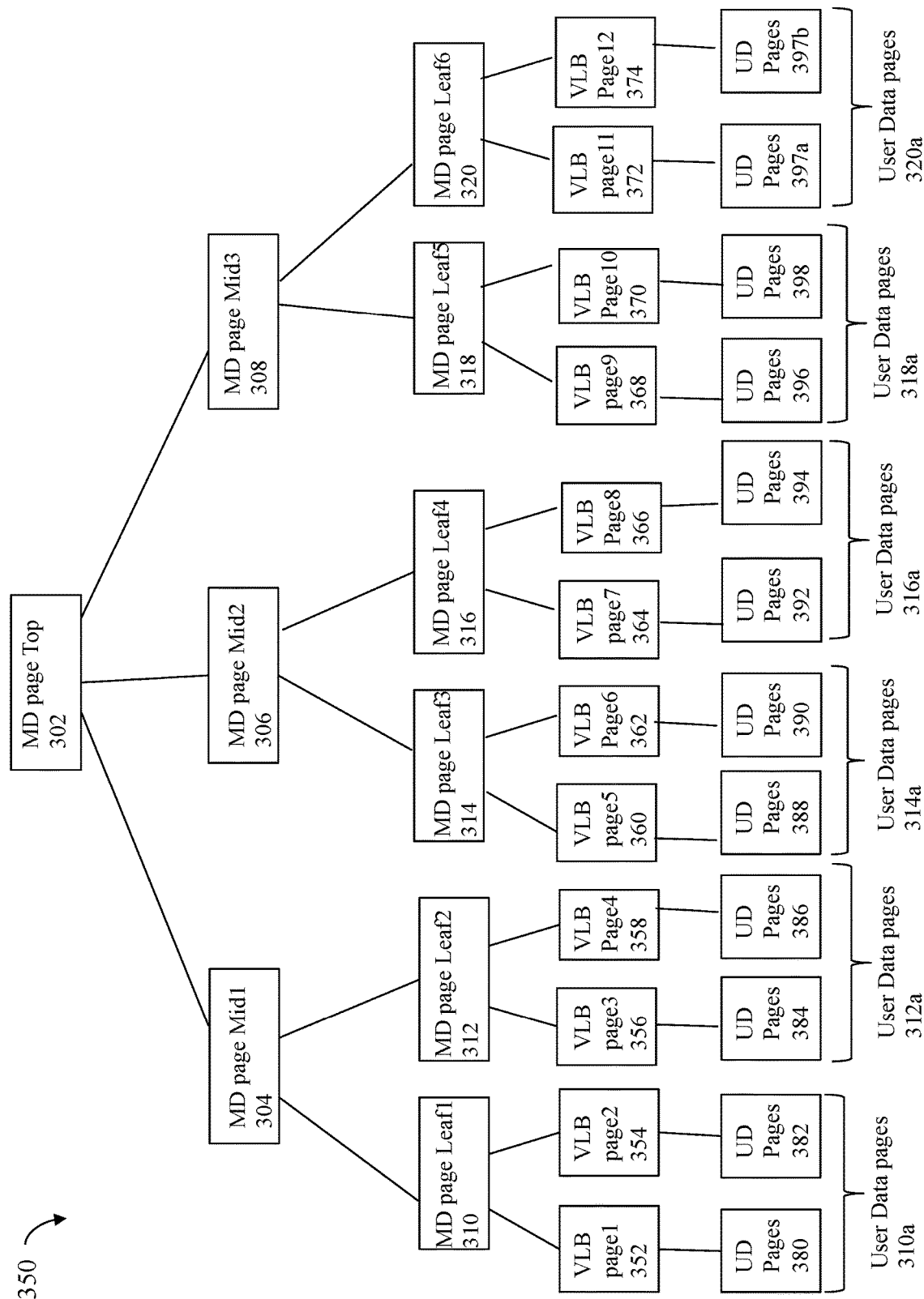

Referring to FIG. 4, shown is a more detailed version of a hierarchical structure used as the mapping structure 108 that may be used in an embodiment in accordance with the techniques herein. The structure 350 is similar to the structure 300 as described and illustrated in FIG. 3 with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages may be used to facilitate different data storage services, such as relocating UD between different physical storage location, data deduplication, and the like. An entry of the VLB associated with a particular physical storage location may be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
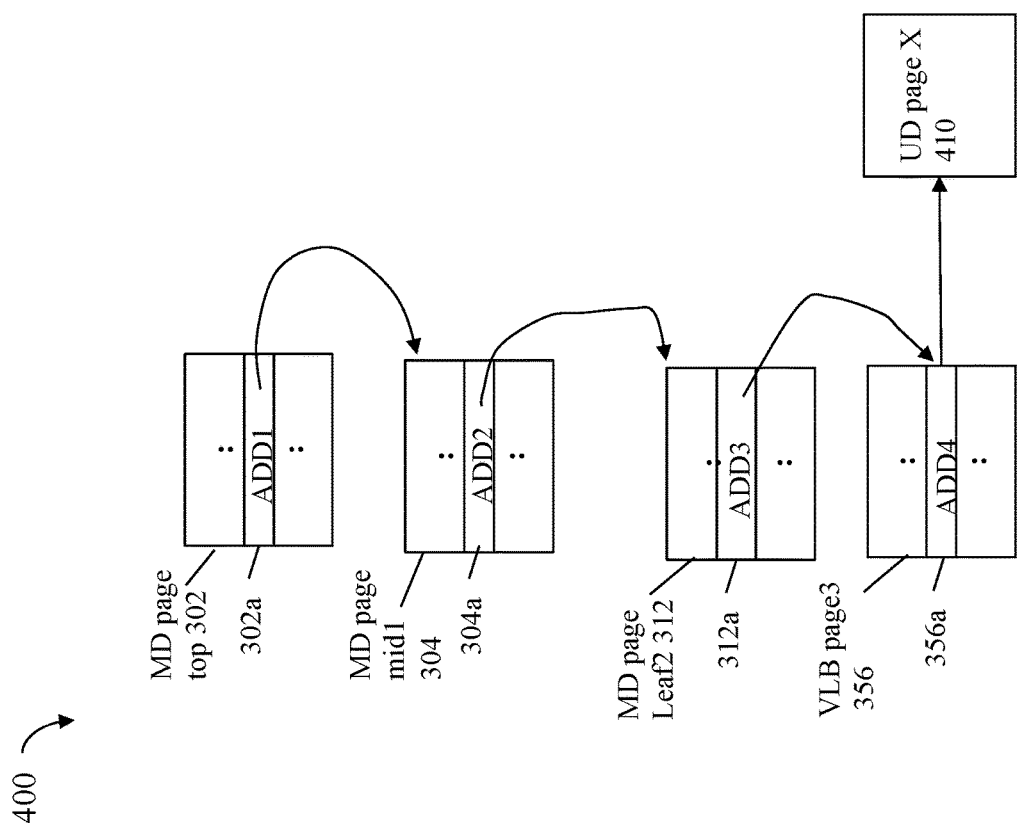

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence may be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 may be used to determine the particular structure instance and thus the particular MD page top 302 to access. The LBA 514 of the logical address of the UD may also be used to determine an index or offset into the MD page 302 to determine the relevant entry, location or address 302a having a pointer, address or reference to the next MD page in the sequence to access the desired page including the UD for LUN A, LBA 514. An embodiment generally may use any suitable technique to map a corresponding logical address, such as an LBA of a particular LUN, to an entry in the top level MD page 302.

The MD page top 302 may be accessed and read from a PD to obtain the address or pointer ADD1 from location 302a. If the MD page 302 is already in cache, the cached copy may be used to obtain the address or pointer ADD1 from the location 302a. The address or pointer ADD1 of location 302a may then be used to identify a particular mid level MD page, such as MD page mid1 304, that is accessed next in the sequence.

Continuing with the example 400, the MD page mid1 304 may be accessed where the location 304a is read to obtain the address or pointer ADD2 from location 304a. The address or pointer ADD2 may then be used to identify a particular leaf level MD page, such as MD page leaf2 312, that is next accessed in the sequence. If the MD page mid1 304 is not in cache, the on-disk copy of the MD page 304 on a PD may be accessed to read the address or pointer ADD2 from the location 304a. The address or pointer ADD2 identifies location 312a of the MD page leaf 2 312. If the MD page 312 is not already in cache, the on-disk copy of the MD page 312 on a PD may be read to obtain the content of location 312a. The location 312a of the MD page leaf2 312 may be accessed and read to obtain the address or pointer ADD3 from location 312a. The address or pointer ADD3 may then be used to identify a particular entry of a VLB page, such as entry 356a of the VLB page3 356, that is next accessed in the sequence. Thus, ADD3 may denote the location or address of the entry 356a in the VLB page 3 356.

If the VLB page 356 is not already in cache, the on-disk copy of the VLB page 356 on a PD may be read to obtain the content of location 356a. The location 356a of the VLB page 3 356 may be accessed and read to obtain the address or pointer ADD4 from the location 356a. The address or pointer ADD4 may then be used to identify the particular UD page X 410 where the UD page X may next be read. If the UD page X is not in cache, the on-disk copy of the UD page X may be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
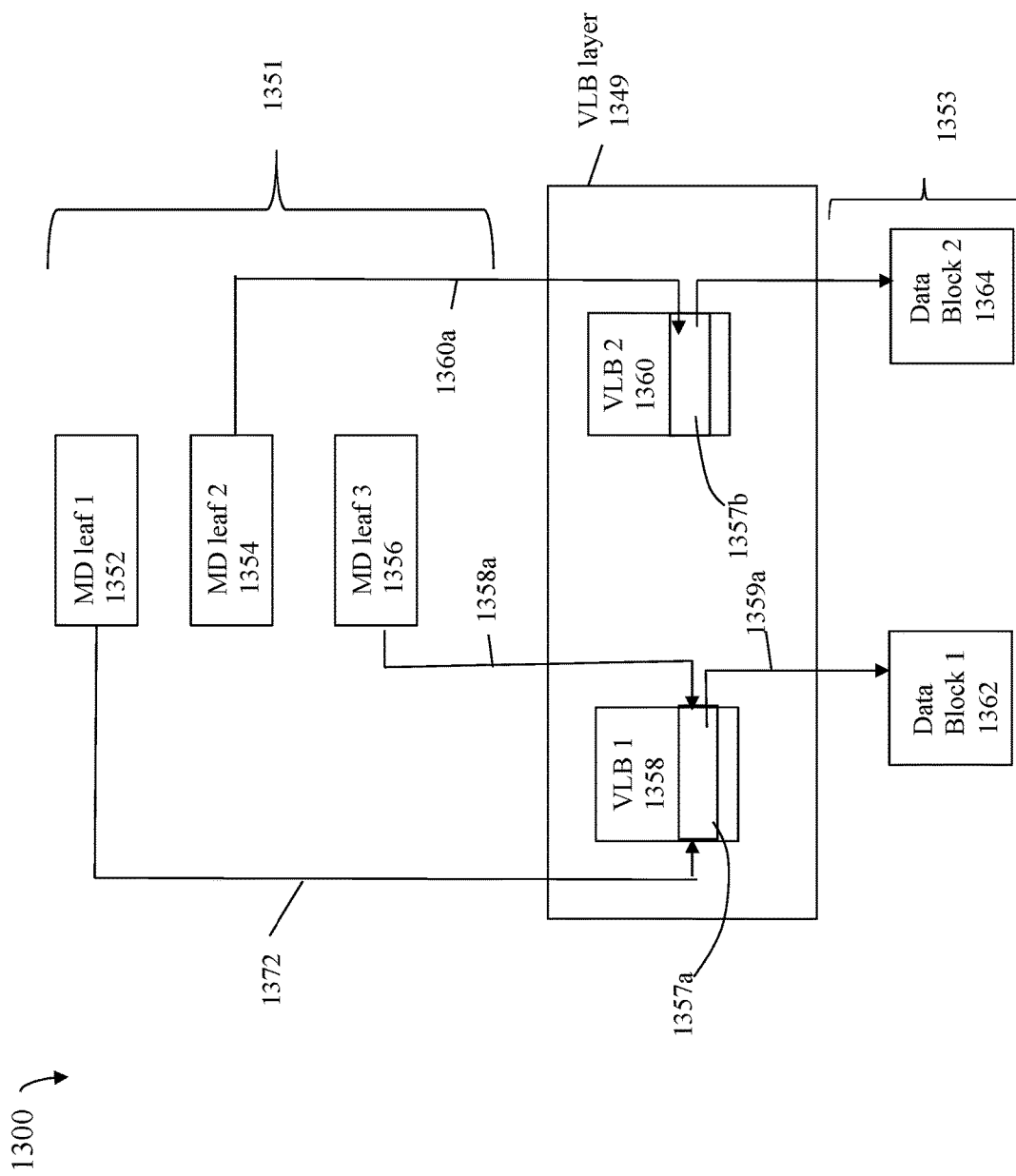

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 may denote 3 MD leaf nodes as may be included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a may be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 may denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a may be used as the virtual or indirect pointer in connection with obtaining the data block 1362. In at least one embodiment, the VLB 1358 may be a VLB page or node as described herein. Thus, in such an embodiment, the virtual or indirect pointer 1358a may be a pointer to the entry 1357a of the VLB structure 1358, where the entry 1357a may further include a pointer to, or address of, the user data block 1362.

The element 1372 denotes a pointer to, or address of, the entry 1357a in the VLB 1358 used in connection with obtaining the data block 1362 stored on a particular LUN and LBA of the LUN. The pointer 1372 may be used as the virtual or indirect pointer in connection with obtaining the data block 1362. In at least one embodiment, the VLB 1358 may be a VLB page or node as described herein. Thus, in such an embodiment, the virtual or indirect pointer 1372 may be a pointer to the entry 1357a of the VLB structure 1358, where the entry 1357a may further include a pointer to, or address of, the user data block 1362.

The element 1360a denotes a pointer to, or address of, the entry 1357b in the VLB 1360 used in connection with obtaining the data block 1364 stored on a particular LUN and LBA of the LUN. The pointer 1360a may be used as the virtual or indirect pointer in connection with obtaining the data block 1364. Thus, in such an embodiment, the virtual or indirect pointer 1360a may be a pointer to the entry 1357b of the VLB structure 1360, where the entry 1357b may further include a pointer to, or address of, the user data block 1364.

In at least one embodiment, each VLB may be a VLB page or node as described herein including multiple entries, such as 512 entries, where each such VLB entry may include one or more fields of information such as the address or pointer to one of the data blocks such as 1362 or 1364.

For a read I/O operation received at a node of a dual node system or appliance such as in an active-active configuration, servicing the read operation may include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation may include reading information from one or more MD pages. Servicing the write operation may include updating one or more data blocks or storage locations as well as updating one or more MD pages such as, for example, of the MD or mapping structure as described in connection with FIGS. 3-6. In at least one embodiment, the MD or mapping information used in connection with stored user data may be stored on non-volatile storage, such as on the BE PDs of the appliance or data storage system. At least some of the MD or mapping information for all such user data may be stored in a volatile memory cache of each of the nodes of the appliance or system. Depending on the write operation, one or more logical addresses may be updated with new data or content by a write operation. Additionally, one or more MD pages used to map the one or more logical addresses to one or more physical storage locations storing the new data may also be updated, for example, to reference the one or more physical storage location including the new data or content.

With a log-structured system in at least one embodiment, as recorded writes of the log are processed and flushed or destaged to the BE PDs, the content written by the recorded writes of the log may be stored at physical storage locations on the BE PDs. Additionally, the MD or mapping information corresponding to the logged writes being flushed may also be accordingly updated to reference the physical storage locations on the BE PDs containing the content. In a dual node appliance or system with an active-active configuration as described herein, both nodes of the system may concurrently receive and service write I/Os, as well as other received requests and commands using shared resources such as, for example, the MD or mapping structure described in connection with the FIGS. 3-6.

In at least one embodiment, updated or modified MD pages of the MD or mapping structure described in connection with the FIGS. 3-6 may also similarly be recorded in records of the log and then flushed or destaged from the log to persistent BE storage of the BE PDs. In at least one embodiment, the MD pages of the MD or mapping structure such as described in connection with the FIGS. 3-6 may be stored in a MD page store on the BE PDs of the system. In some contexts herein, the copy of a MD page as stored in the MD page store on the BE PDs may also be referred to herein as the on-disk copy of the MD page.

In some existing implementations, when an update is made to a MD page, the entire resulting MD page with the update applied may be stored in the log file. In such implementations, an excessive amount of storage used in connection with the log file may be used in that each MD page update may include storing an entire updated MD page in the log file. Additionally, excessive amounts of memory and other resources of the nodes may be used in connection with existing workflows that always load and cache MD pages that are read and/or written.

In at least one implementation, many read and write operations performed with respect to a MD page may only need, respectively, to read or update one field or value of the MD page. For example, a MD update to a MD page may require only updating a relatively small number of bytes, such as 4 bytes or 8 bytes, of a much larger MD page, such as a 4K byte MD page. However, as noted above, existing workflows for some implementations to perform reads and writes to the MD page may include loading the entire MD page into the cache or volatile memory of a node, if the MD page is not already in the cache or volatile memory of the node. Additionally, in at least one existing workflow for servicing a read that reads a portion of a MD page, the entire MD page is reconstructed by applying previously received updates to the MD page before returning the requested portion of the MD page in response to the read MD request.

In this manner, existing implementations and workflows such as noted above may consume an excessive of amount of system resources, such as memory and CPU or processor execution time, resulting in performance degradation.

To improve upon the foregoing, described in the following paragraphs are techniques that may be used to optimize read and write operations that, respectively, read metadata from and write metadata to MD pages. In at least one embodiment, the techniques herein may be used in connection with reading and writing relatively small portions of MD pages. For example, the techniques herein may be used to optimize a write to a MD page where the write only updates a relatively small number of bytes, such as 4 bytes or 8 bytes, of a much larger MD page, such as a 4K byte MD page. For example, the techniques herein may be used to optimize a read that reads only a relatively small number of bytes, such as 4 bytes or 8 bytes, of a much larger MD page, such as a 4K byte MD page.

In at least one embodiment in accordance with the techniques herein, the metadata updates, changes or "deltas" made to MD pages (rather than complete updated MD pages) may be recorded in a metadata log as stored on a log tier of non-volatile memory. Additionally, in at least one embodiment in accordance with the techniques herein, the metadata updates, changes or deltas made to MD pages may also be stored in local volatile memories of the nodes of the system. The in memory copy of the metadata changes, updates or deltas made to MD pages as stored on each of the nodes may also sometimes be referred to herein as the in-memory log, in-memory delta log or in-memory metadata log used by each node in connection with performing processing in accordance with the techniques herein.

The techniques described in the following paragraphs provide for optimizing reading one or more fields or portions of a MD page. In at least one embodiment, a read request to read a field or portion of a MD page may include directly and efficiently reading data from the in-memory log or delta log stored in the node-local volatile memory. For example, the read request may request to read a 4 byte or 8 byte field of a MD page that is 4K bytes in size. If the MD page is not already in the node local cache (e.g., stored in the node's local volatile memory), the in-memory log of the node including the metadata updates, changes or deltas may be searched to determine whether one of the recorded metadata updates or changes of the in-memory log contains the latest data value or content of the requested field of the MD page. For example, the field of the MD page may have been updated where the metadata update to the field is recorded in the in-memory log containing the most recent or most up to date metadata. In this case, the read MD request may be serviced by reading and returning the updated metadata content of the requested field as stored in the in-memory log. In such an embodiment in accordance with the techniques herein, the read MD request may be serviced without loading the MD page from the MD page stored on the BE PDs into the cache or memory of the node servicing the read MD request.

In connection with servicing a write that updates a field or portion of a MD page, the write may be serviced by storing the metadata update written by the write to the in-memory logs of the nodes and also the metadata log as stored on the log tier of non-volatile memory. Additionally, described in the following paragraphs are techniques that may be used in connection with servicing a write to a field of a MD page where the write overwrites an existing or old value stored in the field with a new updated value. In connection with some workflows depending on the particular use of the field, it may be necessary to perform additional processing in connection with the existing or old value stored in the field prior to overwriting it with the new updated value. For example with reference back to FIG. 6, the write may update a field of a MD page, such as a field of a VLB entry, that is a pointer used in connection with accessing user data stored at a logical address. The write updating the MD page may be performed to update the field of the MD page from an old pointer to a new pointer used in connection with accessing new or updated user data stored at the logical address as a result of a host write. In this case, the additional processing may be performed to update one or more other pieces of metadata associated with the old pointer prior to completing the overwriting or updating of the field with the new pointer. For example, as discussed in more detail elsewhere herein, the one or more other pieces of metadata may include a reference count associated with the existing or old data value, where the reference count of the old data is decremented. In at least one embodiment, the decrementing of the reference count of the old data may be deferred until destaging the logged metadata update to the field of the MD page. As discussed in more detail elsewhere herein, destaging may include reading the current version of the MD page from the MD page store and applying one or more destaged metadata updates including the update to the field to the new pointer. Prior to updating the field of the MD page from the old pointer to the new pointer as part of destaging the MD page, additional processing may be performed to use the old pointer to obtain and decrement the reference count associated with the old data referenced using the old pointer. In at least one embodiment, the reference count associated with the old data may denote a current number of references or use of the old data. Thus, if the reference count of the old data is zero after decrementing, then the data block used to store the old data may be deallocated, freed or released for reuse since the reference count of zero indicates there are currently no logical addresses referencing the content (old data) stored in the data block.

The foregoing and other aspects of the techniques herein are described in more detail in the following paragraphs.

In connection with an active-active appliance or system such as described herein, the nodes should be synchronized to guarantee consistent access and updates of the same data and MD objects or MD pages from both nodes. For example, one particular method or protocol that may be used in connection with performing MD updates to one or more MD pages in at least one embodiment in accordance with the techniques herein is described, for example, in U.S. application Ser. No. 17/243,252, filed on Apr. 28, 2021, "System and Method for Consistent Metadata Access Based on Local Locks Semantics in a Multi-Node Cluster", Shveidel, et al., (the '252 application) which is incorporated by reference herein in its entirety. More generally, any suitable technique may be used to synchronize and coordinate access and updates to the MD pages as stored in the in-memory delta logs of the node-local memories, the log stored on NVRAM that may be used to log user data and metadata updates, and the MD page store (e.g., as may be stored on the BE PDs).

At least one embodiment in accordance with the techniques herein may use various structures, organizations and other techniques as described, for example, in U.S. patent application Ser. No. 16/260,660, SYSTEM AND METHOD FOR AGGREGATING METADATA CHANGES IN A STORAGE SYSTEM, Shveidel et al., now U.S. Patent Publication 2020/0241793A1, published Jul. 30, 2020, (also sometimes referred to herein as the '660 patent application or '660 application) which is incorporated by reference herein in its entirety. Some of the structures and organization as described in the '660 application that may be used in connection with the techniques herein are generally described in the following paragraphs. Reference may be made to the '660 application for more detail and additional features that may be used in an embodiment in accordance with the techniques herein.

In at least one embodiment, each metadata update, change or delta made to a MD page may be expressed in the form of a tuple represented as (LI, EI, T, V) where:

LI denotes the logical index of the MD page. The LI may be a unique index of the MD page that is updated. The LI may be used to uniquely identify the MD page in the MD or mapping structure such as described elsewhere herein (e.g., FIGS. 3-6).

EI denotes the entry index denoting a particular entry, offset or location in the MD page denoted by LI.

T denotes the type of metadata update. For example, in at least one embodiment there may be multiple predefined types or allowable values for T. For example, the predefined types or values for T may include one or more of: IDP denoting an update to an address or indirect pointer used to reference a data block (e.g., the indirect pointer may be point to, or be the address of, an VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment may include any suitable number of predefined types that may vary with the supported updates or changes.

V denotes the updated value to be stored.

It should be noted that the particular value of T denoting a particular type may also denote the size of the updated value V. For example, a type for T denoting an address may indicate that the size of V is the size or number of bytes or bits of an address or pointer. As another example, a type of T denoting an integer counter may indicate that the size of V is the size of an integer, such as 32 bits. In some instances, the value of the type T may imply performing an operation such as increment a counter by 1, or decrement a counter by 1, as noted above. In such cases and in some embodiments, the value for V of the tuple may be implied and omitted when T indicates to perform an increment or decrement operation of a field since such an increase or decrease may be with respect to a current or existing value of the counter.

In at least one embodiment, the metadata changes, updates or deltas made to MD pages as recorded in the in-memory logs of the nodes and the metadata log stored on NVRAM may be in the form of tuples.

In at least one embodiment, VLB pages such as of the VLB layer 1349 may also be considered metadata so that updates or changes to metadata as discussed herein may include metadata updates or changes made to VLBs. Thus each metadata update, change or delta made to a MD page that is a VLB may be expressed in the form of a tuple represented as (LI, EI, T, V) as discussed herein.

Figure 7:
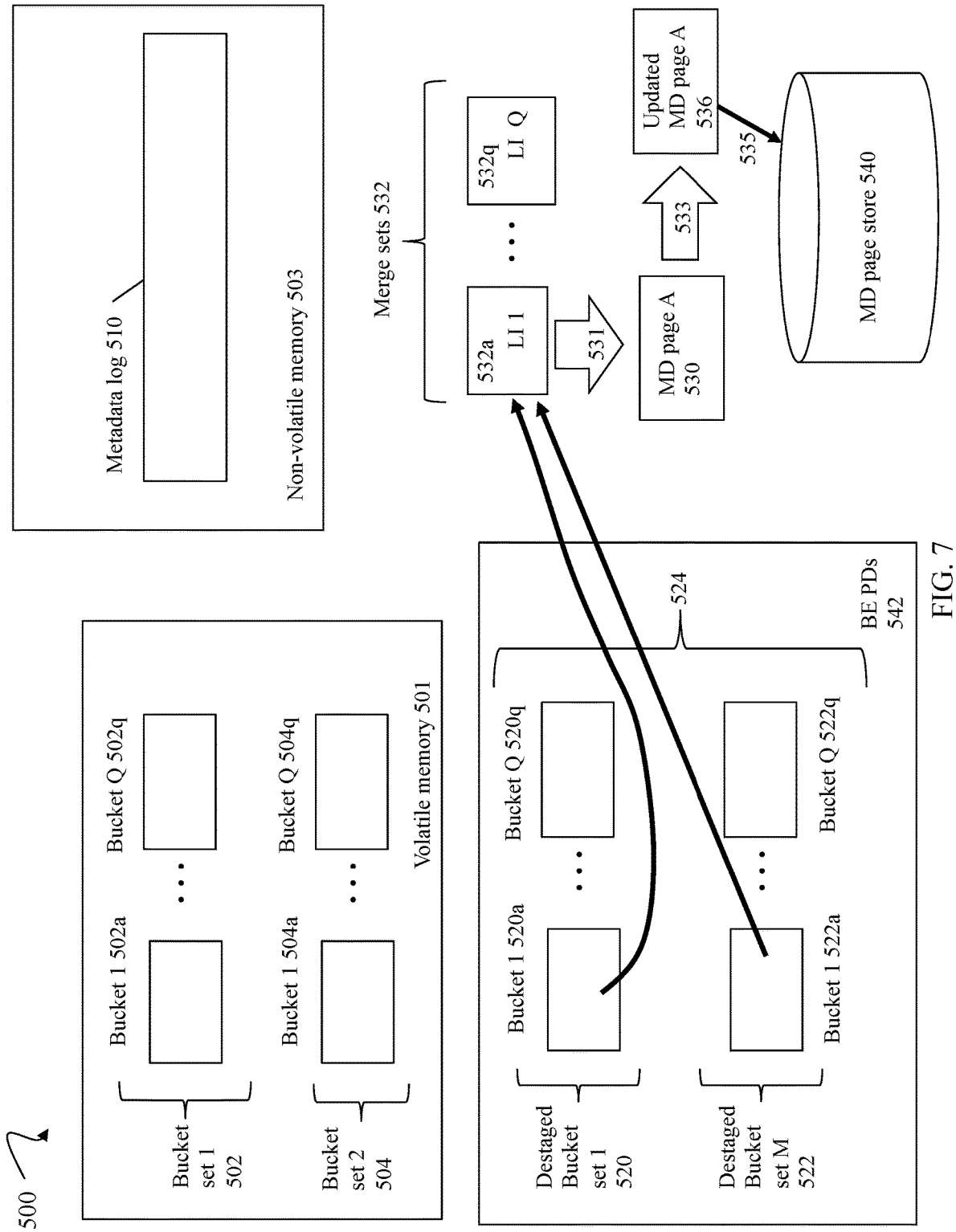
FIG. 7 is an example illustrating structures and associated data flow in an embodiment in accordance with the techniques herein.

Referring to FIG. 7, shown is an example 500 illustrating structures and associated data flow in at least one embodiment in accordance with the techniques herein.

The example 500 includes volatile memory 501, non-volatile memory 503 and non-volatile storage on the BE PDs 542. The volatile memory 501 may denote a volatile memory as included in each node of the appliance or system which includes node local in-memory structures and cached data that may be used in connection with the techniques herein. In particular, the volatile memory 501 includes bucket sets 502, 504 of logged metadata changes, updates or deltas. The non-volatile memory 503 includes the metadata log 510 of metadata updates, changes or deltas. Consistent with other discussion herein, the non-volatile memory 503 may be accessible to both nodes of the system.

In at least one embodiment in accordance with the techniques herein, metadata changes, updates or "deltas" made to MD pages may be recorded and stored in a volatile memory structure in the volatile memory 501 of each node of the system. In this manner, an individual write or update to a MD page may be recorded as a single metadata update in the volatile memory structure. For example, a write that updates only a 4 byte or 8 byte field of a 4K byte MD page may be recorded in the volatile memory structure as a single metadata update. Each metadata update may be represented as a tuple as discussed elsewhere herein in more detail. In at least one embodiment, each tuple may be relatively small in comparison to the size of each MD page.

The volatile memory 501 of each node may include volatile memory structures 502, 504. In at least one embodiment, the structures 502, 504 may denote two bucket sets 502, 504 where at any point in time, one of the two buckets sets 502, 504 may designated as the active set and the remaining bucket set may be designated as the destaging or inactive set. Each metadata update to a MD page may be added to a corresponding one of the buckets of the active bucket set that is uniquely associated with the MD page. For example at a first point in time, the bucket set 1 502 may be active and the bucket set 2 504 may be inactive, where received metadata updates are stored in the bucket set 502. As described in more detail in the following paragraphs, the roles of active and inactive or destaging may be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket may correspond uniquely to a different MD page. The metadata updates of a particular bucket are the recorded metadata updates to the MD page associated with the particular bucket of each bucket set. For example, MD page A may be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment may be further organized as a hash table of buckets where each MD page is mapped to a particular bucket using a hash function. The hash function may map the logical index (LI) uniquely identifying a MD page to a corresponding bucket of metadata updates for the MD page. In at least one embodiment, each of the bucket sets 502, 504 may denote a hash table of buckets implemented as an array, where the hash value HV1 of the LI of a MD page denotes the index of the array and the bucket associated with the MD page. Within each bucket associated with a MD page, the metadata updates may be sorted in a time order, from oldest to newest, based on when the metadata updates are received in the system. In at least one embodiment, each bucket (e.g., 502a) of metadata updates for a MD page may be organized in a binary tree. The metadata updates may be represented as nodes or entries in the binary tree. The metadata updates or nodes of the binary tree may be sorted, at least in part, based on the time order of when the metadata updates are received by the system. The increasing time order may indicate the order in which the metadata updates or changes are applied to the MD page associated with the bucket or binary tree.

More generally, an embodiment in accordance with the techniques herein may use any suitable volatile memory structure(s) and organization to store the metadata updates, changes or deltas to the MD pages.

In at least one embodiment, when a new metadata update U1 is made to a MD page, the metadata update U1 may be represented as a tuple. The metadata update U1 may be inserted into the active bucket set as follows. The hash function H is used to calculate a hash value HV of the LI of the MD page (e.g., H(LI)=HV). The HV may denote the bucket uniquely associated with the MD page being updated. For example, assume the bucket set 502 is the active set and assume that the MD page A is being updated with the new metadata update U1. The MD page A may have an LI that generates a hash value=1 mapping to the first bucket, bucket 1 502a, of the bucket set 502. The bucket 502a may be a binary tree including metadata updates to the MD page A. The metadata update U1 may be inserted into the sorted binary tree of 502a based, at least in part, on when the metadata change U1 was received.

Consistent with other discussion herein, the volatile memory 501 may include 2 sets of buckets 502, 504. At a first point in time T1, a first set of buckets, such as 502, may be designated as the active set and the second set of buckets 504 may be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive may be continuously switched between the two sets at subsequent points in time as the currently designated active set becomes full. In at least one embodiment, the role assignment switching between the two sets of buckets may be performed when at least one bucket in the active set becomes full, or more generally reaches a predefined maximum size limit. In some implementations, each data container may have a predefined data limit before the data container is considered "full". For example, metadata updates to a MD page associated with each bucket may be written to the BE PDs of the system as a separate page (e.g., 4 KB). In this example, the page size may determine the predefined data limit of a bucket. In other words, once a bucket includes a page-worth of metadata changes, processing may determine that the data container is "full".

To further illustrate, at a second point in time T2 subsequent to T1, the first set of buckets 502 currently designated as the active set becomes full and, in response, the second set of buckets 504 may be assigned as the active set and the first set 502 may be assigned as the inactive set. At the second point in time, metadata updates may be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 may be assigned as the active set and the second set 504 assigned as the inactive set. Metadata updates may now be destaged from the second set 504 designated as the inactive set while subsequent metadata updates are now stored in the first set 502 designated as the active set. The foregoing switching of roles of active and inactive between the two sets of buckets 502, 504 may be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages may be destaged in a first phase of destaging from the volatile memory 501 to the BE PDs 542 providing non-volatile backend storage. As mentioned above, metadata updates may be destaged in the first phase of destaging from the particular one of the bucket sets 502, 504 designated as the inactive set. Over time, multiple bucket sets 524 may be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages may be stored and organized on the BE PDs in a manner as described in the '660 application or any other suitable structures and organization. For example, each destaged bucket set of metadata updates for MD pages may be organized into buckets of bucket pages, where each bucket may correspond or map uniquely to a single MD page. For example, the bucket 1 520a of the destaged bucket set 1 520 may include metadata updates for the MD page A as noted above. The bucket (e.g., 520a) of one or more bucket pages associated with a single MD page (e.g., MD page A) may include one or more metadata changes made to the MD page, where the metadata changes may be represented and tuples in the volatile memory structure (e.g., bucket sets 502, 504) of the volatile memory 501. The metadata changes in each bucket, such as 520a, of 524 may be sorted based on insertion time and therefore denote the sorted increasing time order in which the metadata changes are applied to the MD page. In at least one embodiment, the bucket pages of each bucket of 524 may be organized as a list rather than, for example, a binary tree structure as described above in connection with the organization of metadata updates in the volatile memory 501. In at least one embodiment as denoted by the element 524, there may be multiple sets of metadata updates for MD pages stored on the BE PDs 542, where each of the multiple destaged bucket sets of 524 may denote a set of metadata updates destaged from the buckets sets 502, 504 of volatile memory at a different point in time.

In a second phase of destaging, metadata changes, updates or "deltas" from the multiple destaged bucket sets 524 made to the same single MD page may be aggregated and combined into a working set (sometimes referred to as a data container working set) of metadata updates for the MD page. The second phase of destaging may aggregate and combine the metadata updates for each MD page across the multiple destaged sets (520, 522) of metadata updates as stored on the BE PDs in the first phase of destaging. Thus a working set or merge set of metadata updates for a single MD page may denote aggregated metadata updates to the MD page, where the metadata updates may be located in the multiple destaged sets of updates 524 stored on the BE PDs 542. An existing or current version of the MD page may be read from the BE PDs. The working set of metadata changes for the MD page may be applied to, or combined with, the current MD page to thereby result in an updated version of the MD page. The updated MD page may then be persistently stored on the BE PDs replacing the prior current or existing version of the MD page.

To further illustrate, consider the MD page A 530 having an associated LI=1 that maps to the first bucket (e.g., 520a, 522a) in each of the M destaged bucket sets of 524. The second phase of destaging may aggregate and combine the metadata updates for the MD page A 530 from the first buckets (e.g., 520a, 522a) across the multiple M destaged sets 524 of metadata updates as stored on the BE PDs 542 in the first phase of destaging. The element 532a may denote the merge set of aggregated updates from the first buckets 520a, 522a of the destaged sets 524 for the MD page A 530. Thus the merge set or working set 532a of metadata updates for the MD page 530 may denote aggregated metadata updates to the MD page, where the metadata updates may be located in the multiple destaged sets 524 of updates stored on the BE PDs. An existing or current version 530 of the MD page may be read from the BE PDs. The merge set or working set 532a of metadata changes for the MD page A may be applied to (531) the current MD page A 530 to thereby generate (533) an updated version of the MD page A 536. The updated MD page 536 may then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages may be uniquely associated with a corresponding one of the merge sets 532a-q based on the LI of each of the Q MD pages.

In at least one embodiment in accordance with the techniques herein, the metadata changes, updates or deltas may be recorded in the metadata log 510 The metadata log 510 may be stored in the non-volatile memory 503, such as non-volatile Random Access Memory (NVRAM). In some implementations, the metadata log 510 may store metadata updates in time order (e.g., sorted oldest to newest). In some implementations, the metadata log 510 may be used to recover and reconstruct in-memory structures, such as structures of the volatile memories of the nodes of the data storage system. The metadata log 510 may be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing may be performed to release or free the corresponding part of the metadata log storing the destaged metadata changes.

What will now be described are techniques that may be used in connection with servicing reads and writes with respect to metadata of a MD page. It should be noted that in at least one embodiment, a VLB page or structure such as the VLBs 1358 and 1360 of the VLB layer 1349 of FIG. 6 may also generally be considered metadata pages to which the techniques described herein also apply.

The techniques described in the following paragraphs provide for optimizing reading one or more fields or portions of a MD page. In at least one embodiment, a read request to read a field or portion of a MD page may include directly and efficiently reading data from the in-memory log or delta log stored in the node-local volatile memory. For example, the read request may request to read a 4 byte or 8 byte field of a MD page that is 4K bytes in size. If the MD page is not already in the node local cache (e.g., stored in the node's local volatile memory), the in-memory log of the node including the metadata updates, changes or deltas may be searched to determine whether one of the recorded metadata updates or changes of the in-memory log contains the latest data value or content of the requested field of the MD page. For example, the field of the MD page may have been updated where the metadata update to the field is recorded in the in-memory log containing the most recent or most up to date metadata. In this case, the read MD request may be serviced by reading and returning the updated metadata content of the requested field as stored in the in-memory log. In such an embodiment in accordance with the techniques herein, the read MD request may be serviced without loading the MD page from the MD page stored on the BE PDs into the cache or memory of the node servicing the read MD request.

Figure 8:
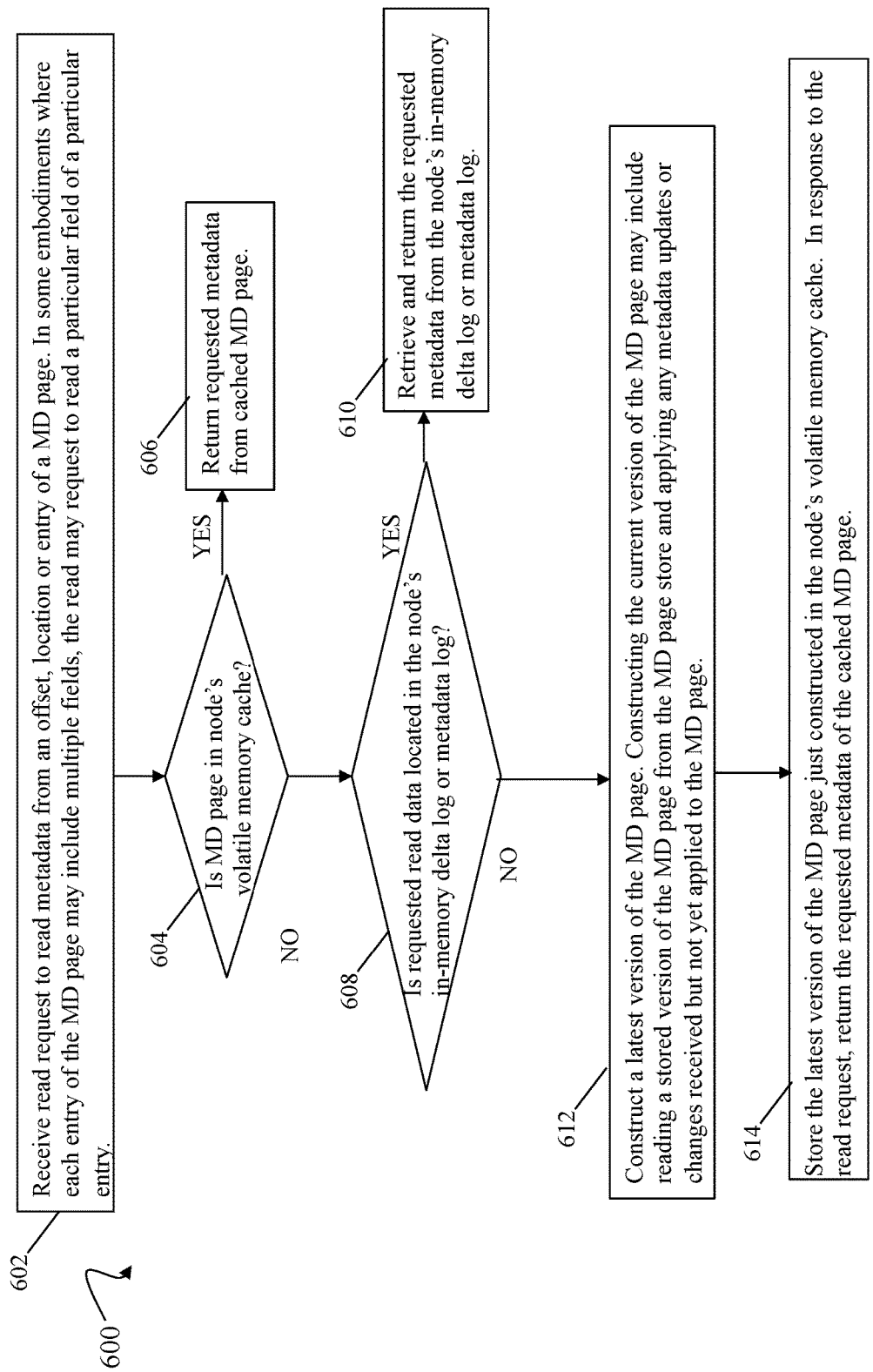
FIGS. 8 and 10 are flowcharts of processing steps that may be performed in an embodiment in accordance with the techniques herein.

Referring to FIG. 8, shown is a flowchart 600 of processing steps that may be used in connection with servicing a read request to read metadata from a MD page.

At the step, 602 a node may receive a request to read metadata from an offset, location or entry of a MD page. In some embodiments where each entry of the MD page may include multiple fields, the read may request to read a particular field of a particular entry of the MD page. For example, consider a VLB page, node or structure such as generally illustrated and described in connection with FIGS. 5 and 6 and elsewhere herein in following paragraphs. In at least one embodiment, each VLB page or structure such as 1358 of FIG. 6 may include 512 entries. Each entry of the VLB may include multiple fields or pieces of information. For example, in at least one embodiment, each VLB entry may include a first field that is a pointer to or address of a data block denoting a BE PD location storing content such as user data; and may include a second field that is a reference count denoting a number of logical addresses that reference the particular data block associated with the pointer or address of the first field of the entry. To further illustrate, reference is made to the VLB 1358 of FIG. 6 that includes the entry 1357a, where the contents of the entry 1357a may be an address of, or pointer to, the data block 1362. Although not explicitly illustrated in FIG. 6, in at least one embodiment each of the MD leaves 1352, 1354 and 1356 may include multiple entries. An entry of the MD leaf 1352 points to (1372) the VLB entry 1357a and an entry of the MD leaf 1356 points to (1358a) the VLB entry 1357a. The above-noted second field of the VLB entry 1357a that is a reference count denotes the number of MD leaf entries that point to or reference the particular VLB entry 1357a. In this case, the second field of the entry 1357a may be 2 denoting the 2 references by pointers 1372 and 1358 to the VLB entry 1357a as depicted by the structures of FIG. 6. Consistent with other discussion herein, the two MD leaf entries of 1352 and 1356 respectively referencing 1372, 1358a the VLB entry 1357a correspond to the mapping or MD information used to map two different logical addresses to the same data block 1362 whereby the same content or data of the data block 1362 is stored at both of the two logical addresses associated with the two MD leaf entries of 1353 and 1356. The foregoing two references to the same VLB entry 1357a and thus the same data block 1362 may be the result of data deduplication processing.

The read request received in the step 602 may request to read a particular offset, entry or location of a MD page such as a MD leaf of or other MD page of the structure of FIGS. 3-6 as described herein. For example, the read request may request to read the metadata of a particular entry of the MD leaf 1352 or 1356. The read request received in the step 602 may request to read a particular offset, entry or location of a VLB page of the VLB layer 1349, such as, for example, to read the metadata of the entry 1357a of the VLB 1358. The read request received in the step 602 may request to read a particular field of a particular offset, entry or location of a MD page or VLB page such as, for example, to read only the first field of the entry 1357a including the address or pointer 1359a, or read only the second field of the entry 1357a including the reference count for the VLB entry 1357a and associated data block 1362. The granularity at which metadata read requests are allowed may vary with embodiment. Additionally, the read request received in the step 602 may generally request one or more pieces of metadata even though for simplicity of illustration processing is described with respect to a request to read a single metadata item. From the step 602, control proceeds to the step 604.

At the step 604, a determination is made as to whether the MD page including the requested read data is currently stored in the node's volatile memory cache. If the step 604 evaluates to yes, a read cache hit is determined with respect to the MD page including the requested read data. If the step 604 evaluates to no, a read cache miss is determined with respect to the MD page including the requested read data and read cache miss processing may be performed. If the step 604 evaluates to yes, control proceeds to the step 606.

At the step 606, processing is performed to return a response to the read request received in the step 602. Processing of the step 606 may include retrieving from the cache MD page the requested metadata, and returning the requested metadata in the response to the read request.

If the step 604 evaluates to no, control proceeds to the step 608. At the step 608, processing may be performed to determine whether the requested metadata is located on the node's in-memory delta log or metadata log. In at least one embodiment, the step 608 may include querying the currently active set of buckets (e.g., the active set of the 502 and 504) stored in the volatile memory 501 of the node. If the requested read data is not located in the currently designated active set of buckets, processing may then proceed to query the inactive set of buckets stored in the volatile memory 501 of the node.

In at least one embodiment, searching for requested metadata may include searching for a particular entry, location or offset in a MD page or VLB page. In such an embodiment, the read request received in the step 602 may include an LI (logical index) uniquely identifying the MD page or VLB page, and may also include an EI (entry index) identifying an entry, offset or location in the particular page. In at least one embodiment, the read request may further identify one or more fields of the particular entry. For example, in such an embodiment, the request may identify a supported type that is a valid type for the T field of a tuple. The different types may be used to extract a particular field from a particular entry including multiple fields. Other embodiments may used other techniques to designate one or more particular fields of an entry including multiple fields, where field level values as opposed to entry level values may be requested and returned. Thus, searching a bucket set, such as 502 or 504, of the in-memory metadata log may include using the hash function H is to calculate a hash value HV of the LI of the VLB or MD page (e.g., H(LI)=HV). The HV may denote the bucket uniquely associated with the MD or VLB page. For example, assume the read request requests the MD page with the LI=1, an EI=10 and a type T=T1. Also assume the bucket set 502 is the bucket set being searched. The hash function H may be used to calculate H(LI=1) which may be, for example, a hash value HV=1. In this case, the bucket 502a corresponds to metadata updates for the MD page with the LI=1. The bucket 502a may then be searched for a corresponding entry, if any, including the latest or most recent metadata update matching LI=1, EI=10 and T=T1.

The step 608 may include first searching the active set of buckets 502, 504 of the node for an entry matching LI=1, EI=10 and T=T1. If more than one matching entry is found in the current active set of buckets 502, 504, the step 608 may evaluate to yes and the entry of the most recent metadata update may be used to retrieve the requested read data. If there is no matching entry in the active set of buckets 502, 504, then the remaining inactive set of buckets being destaged may be searched for an entry matching LI=1, EI=10 and T=T1. If more than one matching entry is found in the inactive set of buckets being desgage, the step 608 may evaluate to yes and the entry of the most recent metadata update may be used to retrieve the requested read data. If no matching entry is found in the inactive set of buckets, the step 608 may evaluate to no.

If the step 608 evaluates to yes, control proceeds to the step 610. At the step 610, the requested read data may be read from the matching metadata update entry from the in-memory metadata log (e.g., from the bucket sets 502, 504 of the volatile memory 501), and returned in response to the read request.

If the step 608 evaluates to no, control proceeds to the step 612. At the step 612, processing may be performed to construct the latest version of the MD page containing the requested metadata. Constructing the current version of the MD page may include reading a stored version of the MD page from the MD page store of the BE PDs, and applying any metadata updates or changes received but not yet applied to the MD page. The metadata updates for the MD page may be aggregated from the in-memory or volatile memory structures of the node's volatile memory 501 and also from the BE PDs 542. In particular, the metadata updates for the MD page may be aggregated and merged from the bucket sets 502 and 504, and also from the destaged bucket sets 524. The metadata updates for the particular MD page may be retrieved based on the LI uniquely associated with the MD page, where the LI is mapped uniquely to a particular bucket in each of the bucket sets 502, 504, and each of the bucket sets of 524. Consistent with other discussion herein, the metadata updates for the MD page may be aggregated and merged. A stored version of the MD page may be retrieved from the MD page store 540, and the merged metadata updates from the MD page may be applied to the stored version of the MD page to thereby obtain the latest version of the MD page. From the step 612, control proceeds to the step 614.

At the step 614, the latest version of the MD page just constructed may be stored in the node's volatile memory cache. In response to the read request, the requested metadata of the cached MD page may be returned.

Thus, FIG. 8 generally describes processing that provides an optimization for reading requested metadata using the in-memory metadata logs of the nodes, such as the bucket sets 502 and 504 of FIG. 7, to return requested metadata when possible. As discussed above, the full MD page construction (e.g., step 612) may occur as a last alternative when the requested metadata is not located in the node's cache (e.g., step 604=no) and is also not located in the node's in-memory delta log or metadata log (e.g., step 608=no).

What will now be described are techniques that may be used in connection with servicing a write to a field of a MD page where the write overwrites an existing or old value stored with a new updated value. In connection with some workflows depending on the particular use of the field, it may be necessary to perform additional processing in connection with the existing or old value stored in the field prior to overwriting it with the new updated value. For example with reference back to FIG. 6, the write may update a field of a MD page, such as a field of a VLB entry, that is a pointer used in connection with accessing user data stored at a logical address. The write updating the MD page may be performed to update the field of the MD page from an old pointer to a new pointer used in connection with accessing new or updated user data stored at the logical address as a result of a host write. In this case, the additional processing may be performed to update one or more other pieces of metadata associated with the old pointer prior to completing the overwriting or updating of the field with the new pointer. For example, as discussed in more detail below, the one or more other pieces of metadata may include a reference count associated with the existing or old data value, where the reference count of the old data is decremented. In at least one embodiment, the decrementing of the reference count of the old data may be deferred until destaging the logged metadata update to the field of the MD page. As discussed in more detail elsewhere herein, destaging may include reading the current version of the MD page from the MD page store and applying one or more destaged metadata updates including the update to the field to the new pointer. Prior to updating the field of the MD page from the old pointer to the new pointer as part of destaging the MD page, additional processing may be performed to use the old pointer to obtain and decrement the reference count associated with the old data referenced using the old pointer. In at least one embodiment, the reference count associated with the old data may denote a current number of references or use of the old data. Thus, if the reference count of the old data is zero after decrementing, then the data block used to store the old data may be deallocated, freed or released for reuse since the reference count of zero indicates there are currently no logical addresses referencing the content (old data) stored in the data block.

Figure 9A:
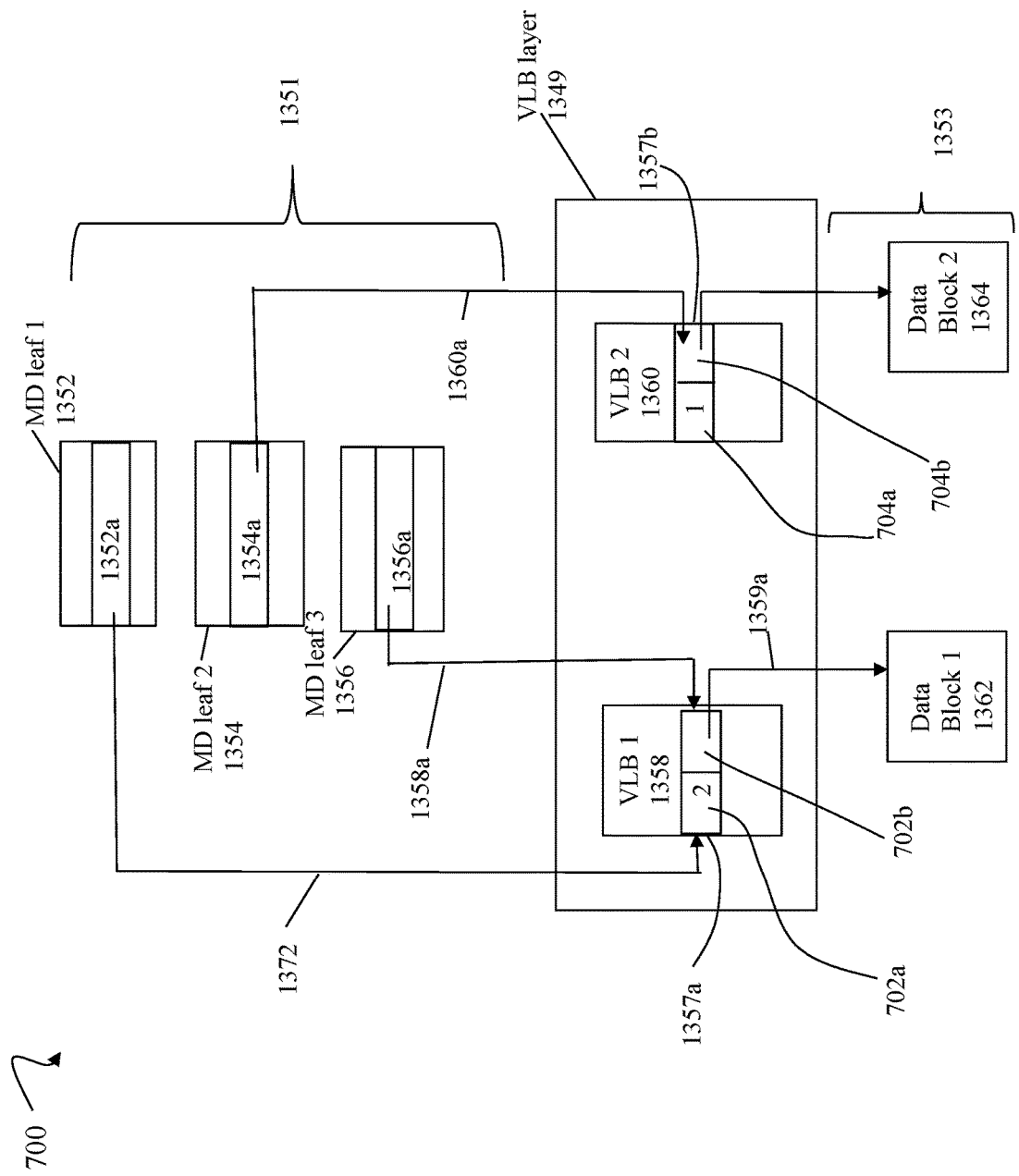

Referring to FIG. 9A, shown is an example 700 illustrating structures that may be used in an embodiment in accordance with the techniques herein.

The example 700 includes structures similar to those of FIG. 6 with additional detail provided for illustrating the techniques herein used in connection with servicing a write to update metadata of a page. The example 700 additionally includes elements 1352a, 1354a and 1356a each denoting a particular entry, respectively, of the MD leaves 1352, 1354 and 1356. Additionally, the VLB 1358 includes the entry 1357a with the following 2 fields: the field 702a denoting the reference count of the entry 1357a and thus the associated data block 1362; and the field 702b denoting the pointer to, or address of (1359a), the data block 1362. The reference count 702b may denote the number of references or pointers to the VLB entry 1357a and thus also the number of references to the data block 1362 by indirect pointers (e.g., such as 1372 and 1358a). Additionally in the FIG. 9A, the VLB 1360 includes the entry 1357b with the following 2 fields: the field 704a denoting the reference count of the entry 1357b and thus the associated data block 1364; and the field 704b denoting the pointer to, or address of the data block 1364. The reference count 704b may denote the number of references or pointers to the VLB entry 1357b and thus also the number of references to the data block 1364 by indirect pointers (e.g., such as 1360a).

In connection with servicing a host or client write I/O to a target logical address that stores new data at the target logical address LA1, processing may include overwriting existing or old data currently stored in the target logical address LA1 with the new data. Assume for purposes of illustration that the target logical address LA1 of the host or client write I/O uses metadata of the mapping structure as discussed herein including the MD leaf entry 1356a which points (1358a) to the entry 1357a. The entry 1357a then includes the field 702b that points to the data block 1362 including the existing or old data currently stored at the target logical address LA1. Additionally, the MD leaf entry 1352a may be used in connection with mapping a second logical address LA2 to the current contents stored at LA2. In particular the contents of the data block 1362 are also stored at LA2 as illustrated by FIG. 9A. The MD leaf entry 1352a points to the VLB entry 1357a, where the entry 1357a includes the field 702b that points to the data block 1362 including the existing or old data currently stored at the logical address LA2. Based on the foregoing, the reference count 702a includes the value 2 denoting the two references by the 2 MD leaf entries 1352a and 1356a.

Consistent with the above, the MD leaf entry 1354a may be used in connection with mapping a third logical address LA3 to the current contents stored at LA3. In particular the contents of the data block 1364 are stored at LA3 as illustrated by FIG. 9A. The MD leaf entry 1342a points to the VLB entry 1357b, where the entry 1357b includes the field 704b that points to the data block 1364 including the existing data currently stored at the logical address LA3. Based on the foregoing, the reference count 702b includes the value 1 denoting the reference by the MD leaf entry 754a.

In connection with servicing the host or client write I/O to the target logical address LA1 noted above that stores new data at the target logical address LA1, assume that the write I/O overwrites LA1 with new data currently stored in the data block 1364. In at least one embodiment based on the structures of FIGS. 9A and 9B, the write I/O workflow that performs the overwrite of the current or existing data of LA1 with new data may include performing at least three (3) metadata updates that may be summarized as follows:

S1. update the MD leaf entry 1356a to point to or reference the VLB entry 1357b rather than the VLB entry 1357a.
S2. decrement by 1 the reference count 702a associated with the old data of the data block 1362.
S3. increment by 1 the reference count 704a associated with the new data of the data block 1364.

Figure 9B:
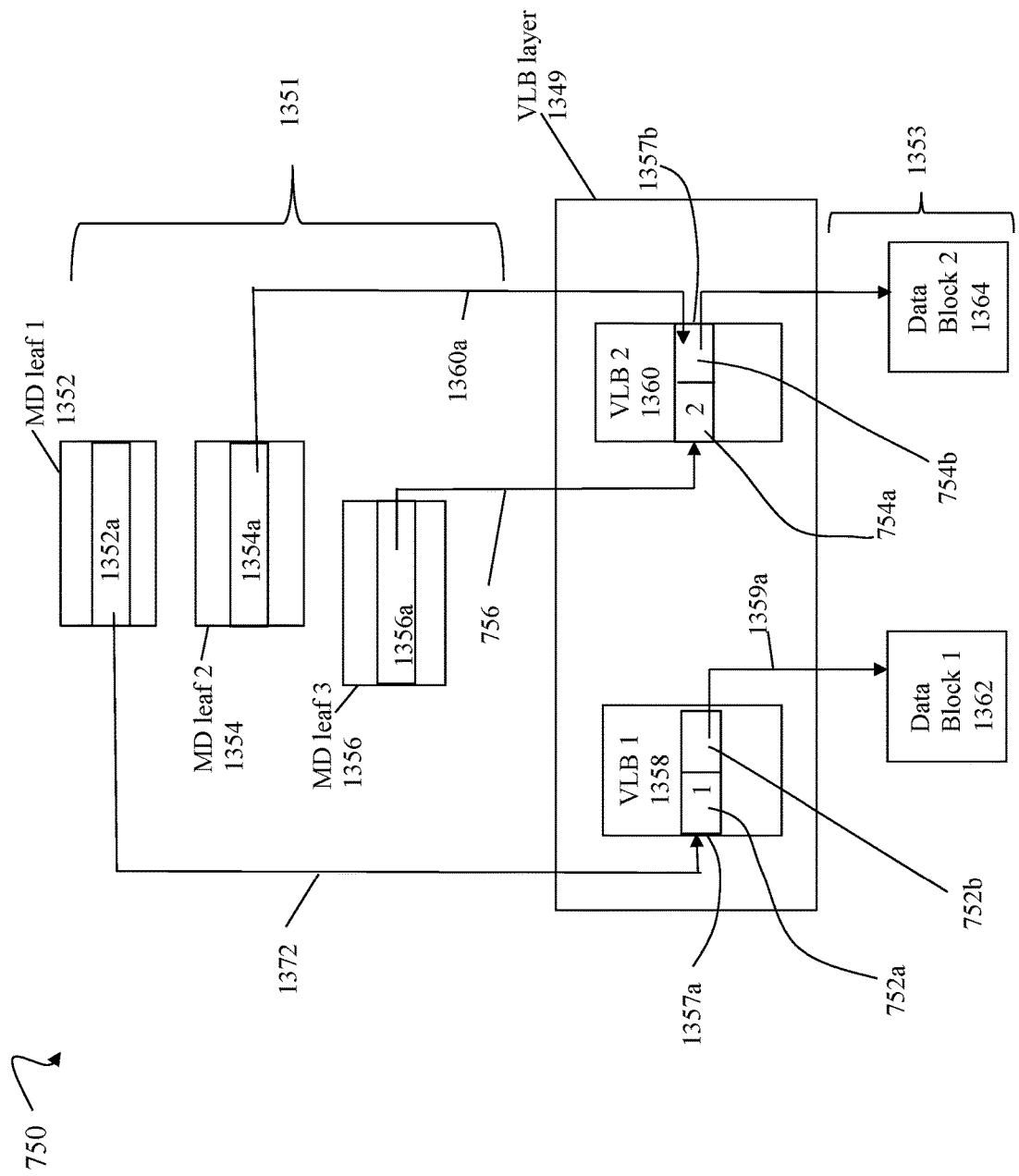

FIG. 9A illustrates the state of the structures prior to servicing the host write I/O and FIG. 9B illustrates the state of the structures after servicing the host write I/O. In particular with reference to FIG. 9B, the VLB entry 1356a associated with the target logical address LA1 is updated and overwritten in S1 above to point to or reference (756) the VLB entry 1357b; the reference counter 752a of the VLB entry 1357a is decremented by 1 to an updated value of 1 corresponding to the single reference by the MD leaf entry 1352a; and the reference counter 754a is incremented by 1 to an updated value of 2 corresponding to the two references by the MD leaf entries 1356a and 1354a.

In connection with performing S2, in at least one embodiment, processing may also be performed to free, release or deallocate a data block if its associated reference count of its associated VLB entry goes to 0. For example with reference to FIG. 9B, if the logical address LA2 is further updated so that the MD leaf entry 1352a no longer references the VLB entry 1357a, the reference count 752a may be decremented from 1 to 0. Additionally, the data block 1362 associated with the VLB entry 1357a may also be deallocated since its associated reference count 752a is now zero.

Consistent with other discussion herein, data deduplication may be performed where the same data block may be referenced by multiple logical addresses where the content of the data block is stored at all the multiple logical addresses, such as illustrated by the multiple MD leaf entries 1352a, 1356a referencing the VLB entry 1357a in FIG. 9A, and the multiple MD leaf entries 1354a, 1356a referencing the VLB entry 1357b in FIG. 9B. The reference count of a VLB entry, such as 754a of FIG. 9B, may indicate the number of references to the associated data block 1364, where each reference denotes a reference to the particular data block by a logical address at which the content of the particular data block is stored. Thus a reference count=2 for 754a of the VLB entry 1357b associated with the data block 1364 indicates that 2 different logical addresses reference the data block 1364 and denote that the content of the data block is stored at two different logical addresses.

In connection with the host write I/O operation noted above in which the 3 metadata updates S1, S2 and S3 are performed for overwrite processing of the target logical address LA1, each of the metadata updates S1, S2 and S3 may be characterized as a small update to only a small portion of a MD page or VLB page. For example updating a reference count as in S2 and S3 may be performed by updating a 4 byte counter included in a much large 4K byte MD page or VLB page. Similarly, updating an address or pointer of a MD leaf entry in S1 may be performed by updating an address field, such as a 64 bit or 8 byte address field included in a much larger 4K byte MD page.

In at least one embodiment, two metadata update records or tuples may be created for the metadata updates of S1 and S3. Consistent with discussion herein, the two metadata updates for S1 and S3 may be created and stored in one of the bucket lists 502, 504 currently designated as the active list in the node that received and is processing the host write I/O. However, when performing S1 where the MD leaf entry 1356a including the old or existing pointer to the VLB entry 1357a is overwritten with the pointer to, or address of, the VLB entry 1357*b*, the old or existing address of 1357*a* as included in the entry 1356*a* is needed to decrement the reference count 702*a* of FIG. 9A associated with the existing data block 1362. However, the old address (of the entry 1357*a*) as stored in the MD leaf entry 1356*a* is not included in a metadata update entry of the in-memory metadata log and may be read from the MD page store of the BE PDs when destaging the metadata updates, such as when destating the metadata update created for S1. Thus, rather than creating a third metadata update or change entry for the metadata change of S2 and adding the third metadata update in the active bucket list, an embodiment in accordance with the techniques herein may perform special or additional processing to implement the metadata change or update of S2 to decrement the counter associated with the old address of the MD leaf entry 1356*a* being overwritten in S1. The special or additional processing to implement S2 may be performed when destaging the metadata updated created for S1. The special or additional processing to implement S2 may be performed in response to detecting the metadata overwrite implemented when destaging the metadata update created for S1.

The step S1 denoted above generally indicates a metadata change that overwrites an existing or old value (e.g., overwrites the address of the MD leaf entry 1356*a*) with a new value, and where prior to performing the overwrite, special or additional processing needs to be performed using the existing or old value. In this particular example, the special or additional processing includes performing the metadata update denoted by S2 to decrement the reference count associated with the old value or old pointer to the VLB entry 1357*a* used to access the old data stored in the data block 1362.

The detection of the overwrite of old metadata with new metadata, such as by the step S1, requiring the special or additional processing using the old or existing metadata may be performed in any suitable manner. In at least one embodiment as discussed above, a first metadata update U11 may be created for S1 and a second metadata update U12 may be created for S3, where the two metadata updates U11 and U12 may be stored in the active list of buckets. Subsequently, the overwrite of the old or existing value needed may be detected when processing the metadata update U11 as part of destaging. For example, in at least one embodiment, the overwrite of U11 may be detected when processing metadata updates as part of aggregating and merging metadata updates made to each MD page when destaging metadata updates. In at least one embodiment, the overwrite of the indirect pointer of the MD leaf entry 1356*a* (U11 for S1) may be detected based on information stored in the metadata update tuple for U11 (S1). The tuple for U11 may include a T type indicating the update type is for an indirect pointer or other type denoting that the metadata update is updating a pointer or address used, directly or indirectly, to access user data or content. Thus, when destaging the metadata update or tuple U11 that updates the MD page entry 1356*a* including a pointer or address of a VLB page entry used to access a data block with stored data, the current MD page 1356 may be read from the MD page store and merged with the metadata updates including U11. Before applying the metadata update U11 and thereby overwriting the old pointer or address to 1357*a* of the MD leaf entry 1356*a* with the new pointer or address to 1357*b*, the old pointer or address of 1357*a* may first be used to access the reference count 702*a* associated with the old or current data 1362 to decrement the reference count from 2 (as denoted by 702*a* of FIG. 9A) to the updated reference count of 1 (as denoted by 752*a* of FIG. 9B). The special or additional processing performed may also include determining whether the reference count associated with the old or current data block 1362 is zero after being decremented. If so, then the data block 1362 storing the old data may be deallocated or freed and made available for reuse. In this manner, the decrement reference count of the old data 1362 needed to implement the metadata change S2 may be performed automatically in connection with destaging the metadata update U11 for S1 that overwrites the old or current metadata of the MD leaf entry 1356*a*.

Consistent with other discussion herein, destaging of the metadata updates for a MD page such as the MD leaf 1356 in the second phase includes reading a current stored version of the MD page from MD page store into memory (e.g., volatile memory of the node), aggregating metadata updates for the MD page, applying the aggregated metadata updates to the current stored version of the MD page thereby producing an updated version of the MD page, and storing the updated version of the MD page in the MD page store. Once destaging processing for the MD leaf page 1356 reads the current stored version from the MD page store into memory prior to updating, the old or existing address of the MD leaf entry 1356*a* that points to the VLB entry 1357*a* may be obtained and used to also access and decrement the reference count 702*a* associated with the old data 1362. In this manner, decrementing the reference count of 1357*a* from 2 (as denoted by 702*a* of FIG. 9A) to 1 (as denoted by 752*a* of FIG. 9B) may be performed as part of destaging when aggregating the metadata updates for the MD leaf page 1356. In particular, the metadata update U11 performing the metadata overwrite of S1 may be detected and, prior to implementing the update U11, the old value of the MD leaf entry 1356*a* may be used to implement the metadata update for S2. Once the metadata update for S2 (that decrements the reference count of 1357*a* associated with the data block 1362 from 2 to 1) has completed, the metadata update U11 for S1 performing the metadata overwrite may be performed to the MD leaf page 1356.

It should be noted that the same MD leaf entry 1356*a* may be updated or overwritten multiple times by multiple metadata updates each having their own tuple. In this case, the special or additional processing as described above may be repeated for each such overwrite detected to accordingly decrementing the associated reference count and implement the metadata update for S2.

The foregoing describes a particular examples of how the techniques herein may be used to optimize overwrite processing performed to overwrite an old or existing value with a new or updated value. More generally, the techniques described herein may be used to optimize overwrite processing that overwrites an existing or old value, where the old or existing value is needed in performing additional processing prior to overwriting the old or existing value with a new updated value. As described above, the techniques herein postpone the additional processing of the old value (e.g., implementing the metadata change of S2) until destaging of the recorded metadata update (e.g., U11 for S1) that overwrites the existing or old value.

In at least one embodiment as discussed above, the metadata update or change types denoting allowable value for T of a tuple may include the following:

1. IDP (indirect pointer update) denoting that the tuple is overwriting or updating the pointer or address of a MD leaf page entry, such as the MD leaf entry 1356*a*, to reference or point to a new VLB entry that further points to, or references, a user data block.

2. INCREF to denote an increment to a reference count of a VLB entry associated with a data block pointed to, or referenced by, a pointer or address field of the VLB entry.

In connection with the example of FIGS. 9A and 9B in at least one embodiment, the metadata update U11 for S1 may be expressed using a first tuple TPL1 that includes: an LI=MDLF2 uniquely identifying the MD leaf 1356; an IE identifying the entry 1356a, a type T=IDP denoting that this metadata update overwrites an existing or old value; V=VLB entry 1357b where the VLB entry 1357b includes an address that points to or references the new data block 1364.

In connection with the example of FIGS. 9A and 9B in at least one embodiment, the metadata update U12 for S3 may be expressed as a second tuple TPL2 that includes: an LI=VLB2 uniquely identifying the VLB 1360; an IE identifying the entry 1357b; and a type T=INCREF denoting that this metadata update increments by 1 a reference count of the entry denoted by IE. In this particular example, a value for V can be omitted and implied to increment by 1 the current reference count of VLB entry 1357b from 1 (denoted by 704a of FIG. 9A) to 2 (as denoted by 754a of FIG. 9B).

As a variation in connection with the example of FIGS. 9A and 9B in at least one embodiment, the metadata update U12 for S3 may be expressed as a second tuple TPL2 that includes: an LI=MDLF2 uniquely identifying the MDLF2 1356; an IE identifying the entry 1356a; and a type T=INCREF denoting that this metadata update increments by 1 a reference count of the VLB entry pointed to by the MD leaf entry 1356a (as denoted by the combination of the LI=MDLF2 uniquely identifying the MDLF2 1356 and the IE identifying the entry 1356a). In this latter variation, the MD leaf entry may be used to reference the VLB entry 1357a including the desired reference count 702a. The value for V can be omitted and implied to increment by 1 the current reference count of VLB entry 1357b from 1 (denoted by 704a of FIG. 9A) to 2 (as denoted by 754a of FIG. 9B).

Based on type T=IDP of the tuple TPL1 for U11 and S1, an overwrite of existing or old data needed for special or additional processing prior to overwrite may be detected during destaging that triggers the special or additional processing. The additional processing may include performing processing that generally uses the existing or old data being overwritten by the metadata update U11 represented by the tuple TPL1.

In response to detecting the overwrite of the existing or old data denoted by metadata update U11, additional processing may be performed that includes decrementing the reference count 702a of FIG. 9A associated with the existing or old data stored in a data block 1362. The additional processing may include obtaining the existing or old indirect pointer 1358a (e.g., address of the VLB entry 1357a) currently stored in the MD leaf entry 1356a prior to applying the metadata update U11 (that overwrites the MD leaf entry 1356a with a new indirect pointer 756 to the new VLB entry 1357b that includes an address or pointer in the field 754b used to access the updated data stored in the data block 1364.

In at least one embodiment with reference to FIG. 9A, the old indirect pointer 1358a of the MD leaf entry 1356a may point to or reference a first VLB entry 1357a that includes a first field and a second field. The first field 702a of the VLB entry 1357a may be a reference count associated with the existing or old data stored in the data block 1362. The second field 702b of the VLB entry 1357a may be a pointer that further points to the existing or old data stored in the data block 1362. The additional processing may include decrementing the reference count associated with the existing or old data from 1 (as in 702a of FIG. 9A) to 2 (as denoted by 752a of FIG. 9B). If the resulting reference count of 752a associated with the existing or old data 1362 is zero, the additional processing may further include deallocating or freeing for reuse the data block in which the existing or old data is stored. In this example illustrated in FIGS. 9A and 9B, the value of 752b is 1 so that the associated data block 1362 is not deallocated since it is still references by the MD leaf entry 1352a.

Figure 10:
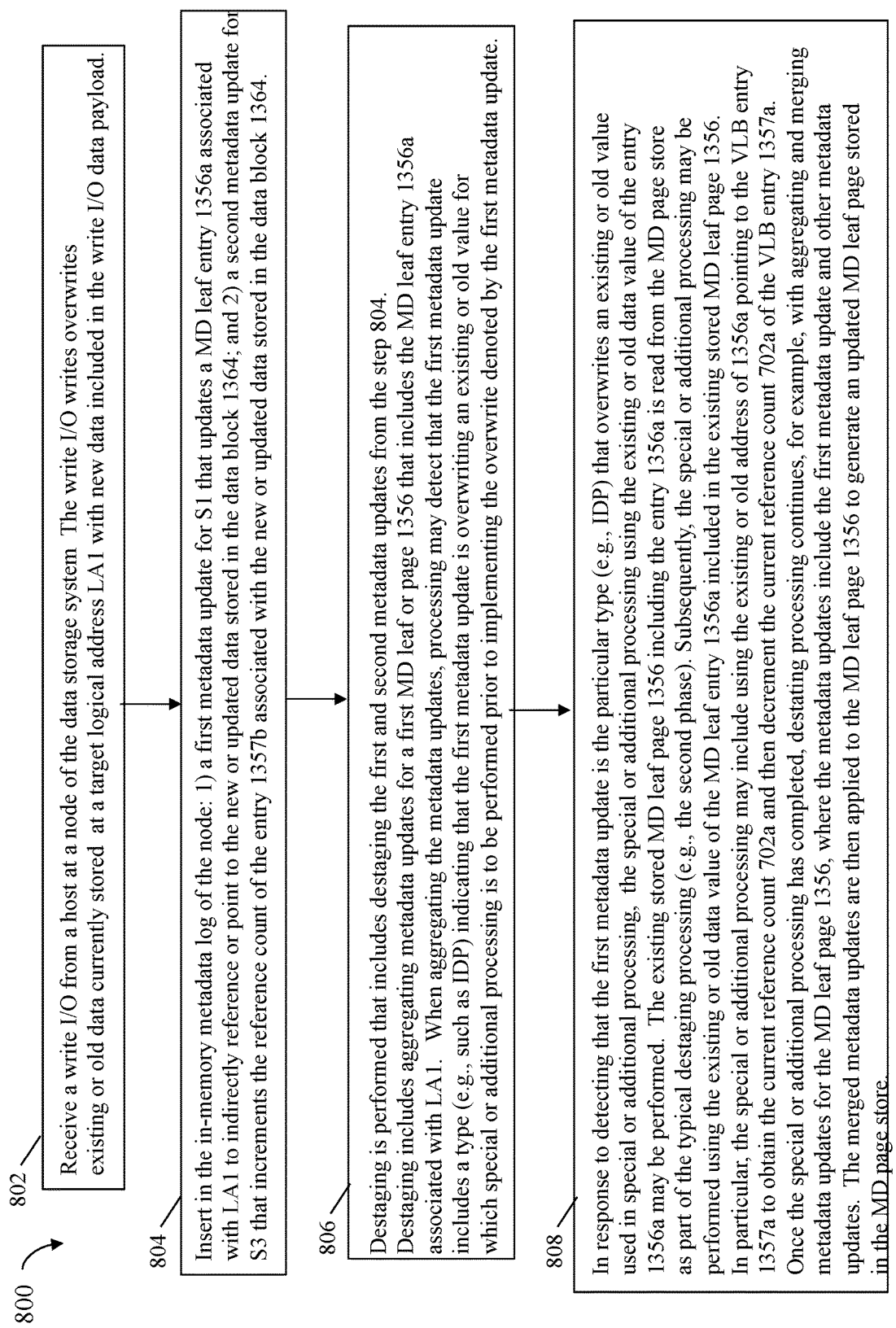

Referring to FIG. 10, shown is a flowchart 800 of processing steps that may be performed in an embodiment in accordance with the techniques herein. The flowchart 800 summarizes processing described above in connection with processing a received host write I/O that overwrites an old or existing data value.

At the step 802, a write I/O from a host may be received at a node of the data storage system The write I/O writes overwrites existing or old data currently stored at a target logical address LA1 with new data included in the write I/O data payload. From the step 802, control proceeds to the step 804.

At the step 804, processing is performed to create and store metadata updates for the received host write I/O in the in-memory data log of the node. The step 804 may include inserting in the in-memory metadata log of the node: 1) a first metadata update for S1 that updates a MD leaf entry 1356a associated with LA1 to indirectly reference or point to the new or updated data stored in the data block 1364; and 2) a second metadata update for S3 that increments the reference count of the entry 1357b associated with the new or updated data stored in the data block 1364. From the step 804, control proceeds to the step 806.

At the step 806, destaging is performed that includes destaging the first and second metadata updates from the step 804. Consistent with other discussion herein, destaging includes aggregating metadata updates for a first MD leaf or page 1356 that includes the MD leaf entry 1356a associated with LA1. When aggregating the metadata updates, processing may detect that the first metadata update for S1 includes a type (e.g., such as IDP) indicating that the first metadata update is overwriting an existing or old value for which special or additional processing is to be performed prior to implementing the overwrite denoted by the first metadata update. From the step 806, control proceeds to the step 808.

At the step 808, in response to detecting that the first metadata update is the particular type (e.g., IDP) that overwrites an existing or old value used in special or additional processing, the special or additional processing using the existing or old data value of the entry 1356a may be performed. The existing stored MD leaf page 1356 including the entry 1356a is read from the MD page store as part of the typical destaging processing (e.g., the second phase). Subsequently, the special or additional processing may be performed using the existing or old data value of the MD leaf entry 1356a included in the existing stored MD leaf page 1356. In particular, the special or additional processing may include using the existing or old address of 1356a pointing to the VLB entry 1357a to obtain the current reference count 702a and then decrement the current reference count 702a of the VLB entry 1357a. Once the special or additional processing has completed, destaging processing continues, for example, with aggregating and merging metadata updates for the MD leaf page 1356, where the metadata updates include the first metadata update and other metadata updates. The merged metadata updates are then applied to the MD leaf page 1356 to generate an updated MD leaf page stored in the MD page store. Additionally, destaging is performed in connection with other metadata updates such as the second metadata update of the step 804.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A computer-implemented method comprising:
receiving a write request to update second metadata from a second entry of a second metadata page;
recording a first metadata change in a metadata log, wherein the first metadata change indicates to update the second entry of the second metadata page with the second metadata as an updated value; and
performing first processing to destage the first metadata change from the metadata log, wherein the first processing to destage the first metadata change from the metadata log includes:
determining whether the first metadata change overwrites an existing value of the second entry of the second metadata page where the existing value is needed in performing second processing prior to overwriting the existing value with the second metadata as the updated value; and
responsive to determining that the first metadata change overwrites an existing value of the second entry of the second metadata page where the existing value is needed in performing said second processing prior to overwriting the existing value with the second metadata as the updated value, performing said second processing comprising:
reading from non-volatile storage a stored version of the second metadata page;
obtaining, from the stored version of the second metadata page, the existing value of the second entry of the second metadata page;
performing third processing using the existing value of the second entry of the second metadata page; and
after completing the third processing, applying one or more metadata changes to the second metadata page, wherein the one or more metadata changes include the first metadata change that overwrites the existing value of the second entry of the second metadata page with the second metadata.

2. The computer-implemented method of claim 1, further comprising:
receiving a read request to read first metadata from a first entry of a first metadata page;
determining whether the first metadata page is included in a cache;
responsive to determining the first metadata page is included in the cache, obtaining the first metadata from a cached copy of the first metadata page included in the cache and returning the first metadata;
responsive to determining the first metadata page is not included in the cache, determining whether the first metadata is included in the metadata log of metadata changes stored in a volatile memory; and
responsive to determining the first metadata is included in the metadata log of metadata changes stored in the volatile memory, obtaining the first metadata from the metadata log and returning the first metadata.

3. The computer-implemented method of claim 2, wherein the metadata log of metadata changes includes an active set of buckets of metadata changes, wherein each of the buckets of the active set is uniquely associated with a different one of a plurality of metadata pages.

4. The computer-implemented method of claim 3, wherein determining whether the first metadata is included in a metadata log of metadata changes stored in the volatile memory includes:
mapping a first index uniquely identifying the first metadata page to a first bucket of the active set; and
searching the first bucket for a recorded metadata change including the first metadata.

5. The computer-implemented method of claim 4, wherein the first entry is one of a plurality of entries included in the first metadata page.

6. The computer-implemented method of claim 2, wherein the metadata change log records first metadata changes made to a plurality of metadata pages and wherein each of the first metadata changes is represented as a tuple including a logical index uniquely identifying one of the plurality of metadata pages, an entry index identifying an entry in said one metadata page, a type indicating a type of metadata change or update, and a new metadata value to be stored in the entry identified by the logical index and the entry index of the tuple.

7. The computer-implemented method of claim 2, further comprising:
responsive to determining the first metadata is not included in the metadata log of metadata changes stored in the volatile memory, constructing a latest version of the first metadata page.

8. The computer-implemented method of claim 7, wherein constructing the latest version of the first metadata page includes:
retrieving a stored version of the first metadata page from non-volatile backend storage; and
applying first metadata changes to the stored version of the first metadata page.

9. The computer-implemented method of claim 8, wherein the first metadata changes include one or more metadata changes of the metadata log stored in the volatile memory.

10. The computer-implemented method of claim 8, wherein the first metadata changes include one or more metadata changes of the metadata log that have been destaged from the metadata log and stored in the volatile memory to non-volatile storage.

11. The computer-implemented method of claim 1, wherein the first metadata change overwrites a first pointer or address with a second pointer or address, wherein the first pointer or address is used to reference a first data block storing first user data, and wherein the second pointer or address is used to reference a second data block storing second user data.

12. The computer-implemented method of claim 11, wherein the first pointer or address is used to indirectly reference the first data block storing first user data, and wherein the second pointer or address is used to indirectly reference the second data block storing second user data.

13. The computer-implemented method of claim 11, wherein the first metadata change is one of a plurality of metadata changes recorded in the metadata log stored in the virtual memory in response to receiving a write I/O operation from a host.

14. The computer-implemented method of claim 13, wherein the write I/O writes the second user data to a target logical address, the first user data is stored at a target logical address prior to performing the write I/O, and the write I/O overwrites the first user data stored at the target logical address with the second user data.

15. The computer-implemented method of claim 14, wherein the third processing includes using the first pointer or address to access a reference count associated with the first data block and decrementing the reference count associated with the first data block.

16. A system comprising:
one or more processors; and
one or more memories comprising code stored thereon that, when executed, performs a method of comprising:
receiving a write request to update second metadata from a second entry of a second metadata page;
recording a first metadata change in a metadata log, wherein the first metadata change indicates to update the second entry of the second metadata page with the second metadata as an updated value; and
performing first processing to destage the first metadata change from the metadata log, wherein the first processing to destage the first metadata change from the metadata log includes:
determining whether the first metadata change overwrites an existing value of the second entry of the second metadata page where the existing value is needed in performing second processing prior to overwriting the existing value with the second metadata as the updated value; and
responsive to determining that the first metadata change overwrites an existing value of the second entry of the second metadata page where the existing value is needed in performing said second processing prior to overwriting the existing value with the second metadata as the updated value, performing said second processing comprising:
reading from non-volatile storage a stored version of the second metadata page;
obtaining, from the stored version of the second metadata page, the existing value of the second entry of the second metadata page;
performing third processing using the existing value of the second entry of the second metadata page; and
after completing the third processing, applying one or more metadata changes to the second metadata page, wherein the one or more metadata changes include the first metadata change that overwrites the existing value of the second entry of the second metadata page with the second metadata.

17. A non-transitory computer readable medium comprising code stored thereon that, when executed, performs a method comprising:
receiving a write request to update second metadata from a second entry of a second metadata page;
recording a first metadata change in a metadata log, wherein the first metadata change indicates to update the second entry of the second metadata page with the second metadata as an updated value; and
performing first processing to destage the first metadata change from the metadata log, wherein the first processing to destage the first metadata change from the metadata log includes:
determining whether the first metadata change overwrites an existing value of the second entry of the second metadata page where the existing value is needed in performing second processing prior to overwriting the existing value with the second metadata as the updated value; and
responsive to determining that the first metadata change overwrites an existing value of the second entry of the second metadata page where the existing value is needed in performing said second processing prior to overwriting the existing value with the second metadata as the updated value, performing said second processing comprising:
reading from non-volatile storage a stored version of the second metadata page;
obtaining, from the stored version of the second metadata page, the existing value of the second entry of the second metadata page;
performing third processing using the existing value of the second entry of the second metadata page; and
after completing the third processing, applying one or more metadata changes to the second metadata page, wherein the one or more metadata changes include the first metadata change that overwrites the existing value of the second entry of the second metadata page with the second metadata.

* * * * *